US00RE48568E

(19) United States
(12) Reissued Patent
Polyakov et al.

(10) Patent Number: US RE48,568 E
(45) Date of Reissued Patent: May 25, 2021

(54) METHOD AND SYSTEM FOR EXECUTING SLOTS ADVENTURE GAMES

(71) Applicant: Murka Games Limited, Limassol (CY)

(72) Inventors: Maxym Polyakov, Menlo Park, CA (US); Anton Krasnyy, Menlo Park, CA (US)

(73) Assignee: MURKA GAMES LIMITED, Limassol (CY)

(21) Appl. No.: 15/858,347

(22) Filed: Dec. 29, 2017

Related U.S. Patent Documents

Reissue of:
(64) Patent No.: 9,547,956
Issued: Jan. 17, 2017
Appl. No.: 14/997,486
Filed: Jan. 16, 2016

(51) Int. Cl.
*G07F 17/32* (2006.01)
*G07F 17/34* (2006.01)

(52) U.S. Cl.
CPC ..... *G07F 17/3262* (2013.01); *G07F 17/3267* (2013.01); *G07F 17/34* (2013.01); *G07F 17/3211* (2013.01); *G07F 17/3269* (2013.01); *G07F 17/3286* (2013.01); *G07F 17/3295* (2013.01)

(58) Field of Classification Search
CPC .. G07F 17/3262; G07F 17/3267; G07F 17/34; G07F 17/3269; G07F 17/3295; G07F 17/3286; G07F 17/3211
See application file for complete search history.

(56) References Cited

U.S. PATENT DOCUMENTS 6,758,757 B2 * 7/2004 Luciano, Jr. ..... G07F 17/32 463/16
6,869,360 B2 * 3/2005 Marks ..... G07F 17/3244 463/20
7,335,102 B2 * 2/2008 Baerlocher ..... G07F 17/32 463/16
8,360,854 B2 * 1/2013 Popovich ..... G07F 17/32 463/22
8,628,408 B2 * 1/2014 Popovich ..... A63F 13/00 463/10
8,734,234 B1 * 5/2014 Guase ..... G07F 17/326 463/16
8,753,193 B2 * 6/2014 Popovich ..... G07F 17/32 463/10
8,784,181 B2 * 7/2014 Caputo ..... G07F 17/32 273/248
8,858,321 B2 * 10/2014 Popovich ..... G07F 17/32 463/10
9,147,314 B2 * 9/2015 Muir ..... G07F 17/32
9,280,870 B2 * 3/2016 Aoki ..... G07F 17/3244
9,286,758 B2 * 3/2016 Vann ..... G06Q 30/02
9,478,098 B2 * 10/2016 Polyakov ..... G07F 17/3218
(Continued)

*Primary Examiner* — Jalatee Worjloh
(74) *Attorney, Agent, or Firm* — Georgiy L. Khayet

(57) ABSTRACT

A method for executing a slots adventure game comprises the steps of displaying a virtual path for the slots adventure game and presenting to a player a first level (unlocked level) linked to the virtual path and subsequent levels (locked levels) linked to the same virtual path. Further, a selected slots game with the current quest task is initiated based on a player's selection. The player is then enabled to pass game levels by unlocking each of the subsequent levels sequentially.

28 Claims, 17 Drawing Sheets

(56) References Cited

U.S. PATENT DOCUMENTS

2002/0094871 A1* 7/2002 Luciano, Jr. ..... G07F 17/32 463/43
2003/0054875 A1* 3/2003 Marks ..... G07F 17/3244 463/20
2005/0233796 A1* 10/2005 Baerlocher ..... G07F 17/32 463/16
2007/0298856 A1* 12/2007 Gilmore ..... G07F 17/32 463/16
2008/0182650 A1* 7/2008 Randall ..... G07F 17/32 463/25
2009/0061991 A1* 3/2009 Popovich ..... G07F 17/32 463/25
2009/0061997 A1* 3/2009 Popovich ..... G07F 17/32 463/26
2009/0061998 A1* 3/2009 Popovich ..... G07F 17/32 463/26
2009/0061999 A1* 3/2009 Popovich ..... G07F 17/32 463/26
2012/0115580 A1* 5/2012 Hornik ..... G07F 17/34 463/25
2012/0115581 A1* 5/2012 Englman ..... G07F 17/34 463/25
2013/0079107 A1* 3/2013 Owen ..... G07F 17/3276 463/25
2014/0364191 A1* 12/2014 Polyakov ..... G07F 17/34 463/20
2015/0052078 A1* 2/2015 Fowler ..... G06Q 40/08 705/36 R
2015/0356824 A1* 12/2015 Aoki ..... G07F 17/3244 463/25
2016/0027246 A1* 1/2016 Newton ..... G07F 17/3237 463/16
2016/0062521 A1* 3/2016 Rouse ..... A63F 13/216 463/31
2016/0114250 A1* 4/2016 Guthridge ..... A63F 13/12 463/23
2016/0171827 A1* 6/2016 Washington ..... G07F 17/3227 463/22
2016/0171835 A1* 6/2016 Washington ..... G07F 17/3244 463/25
2016/0206963 A1* 7/2016 Walls ..... A63F 13/10
2016/0214019 A1* 7/2016 Santini ..... G07F 17/3244
2016/0267509 A1* 9/2016 Grosso ..... G06Q 30/0283
2016/0284161 A1* 9/2016 Thomas ..... G07F 17/3216

* cited by examiner

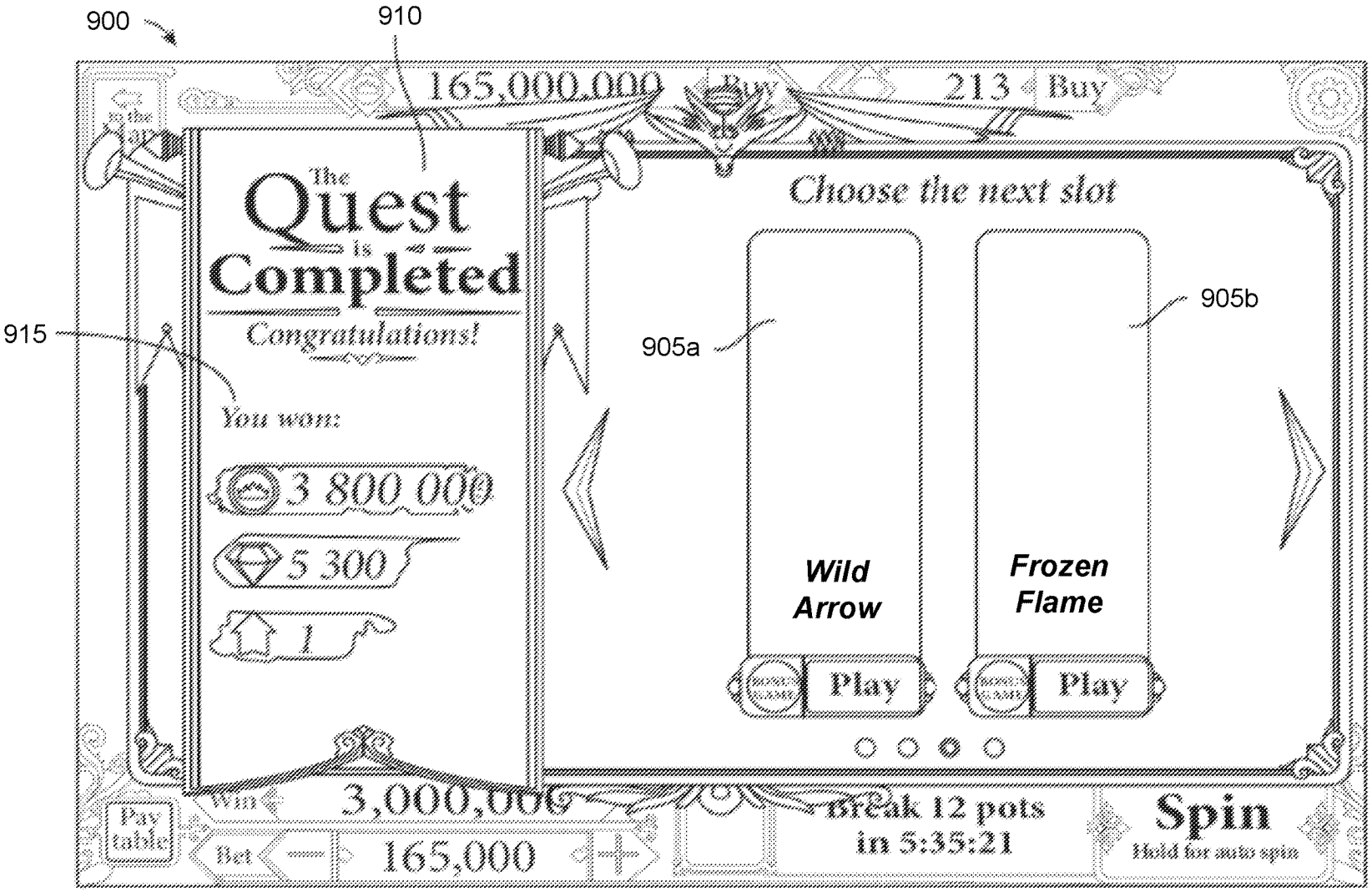
FIG. 9
*Amended*

METHOD AND SYSTEM FOR EXECUTING SLOTS ADVENTURE GAMES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is a reissue application of U.S. Pat. No. 9,547,956 and claims benefit under 35 U.S.C. 120 as an application for reissue of U.S. Pat. No. 9,547,956, originally issued on Jan. 17, 2017.*

BACKGROUND

Technical Field

This disclosure generally relates to slots games and slot machines. More particularly, this disclosure relates to methods and systems for executing a slots adventure game.

Description of Related Art

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Casino gambling games are very popular around the world. One of the most popular casino games is a slots game, which is played with a "slot machine." Today, slot machines can be mechanical apparatuses, computer-based apparatuses, and even virtual or online game machines available for the players through a wide range of personal computing devices. In general, slot machines have three or more reels, which spin when a button or lever is pushed. The reels have multiple images and a reward is given to the player if one of a predetermined combination of these images is shown to the player when all the reels are stopped. Slot machines are also known as one-arm bandits, fruit machines, poker machines, video keno, video poker, video blackjack, and the like. In this document, these terms are collectively referred to as "slot machines" for simplicity.

Since slot machines are an important source of income for the gambling industry, casinos constantly search for ways to enhance the gaming experience, provide additional incentives for the players, and distinguish slot machines from rivals. In many cases, however, known incentives and improvements to the existing slot machines are not sufficient to attract new players or to retain existing players at slot machines. Thus, there is a need in the art to improve slot machines, improve slots games and provide better gaming experience.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

According to one aspect of this disclosure, there is provided a computer-implemented method for executing a slots adventure game (hereinafter also referred to as "game" for simplicity). The method comprises the steps of: displaying to a player a virtual path for the slots adventure game having multiple levels, wherein each of the levels is associated with one of a plurality of level types; presenting to the player a first level associated with the virtual path, wherein a first slots game of the first level is readily available for the player to play; presenting to the player subsequent levels associated with the same virtual path, wherein the subsequent levels are locked and not initially available for the player to play; receiving from the player a selection to initiate a slots game associated with the first level; displaying to the player a quest task associated with the current slots game; initiating a selected slots game based on the selection of the player; and based on one or more conditions (e.g., associated with an amount of in-game currency collected by the player), enabling passing the levels by unlocking each of the subsequent levels sequentially (one after another).

In certain embodiments, the method further comprises a way of providing the player with a bonus slots game, which is associated with "Scatter Slot game to enable the player to win additional in-game currency. The method may further comprise a step of upgrading in-game currency in the bonus slots game.

In certain embodiments, the method further comprises a way of passing the levels, wherein the player is enabled to pass the levels by completing quest tasks of preceding levels.

In certain embodiments, the method further comprises a step of displaying a pointer on the virtual path, wherein the pointer is associated with an advancement of the player in the slots adventure game. The method may further comprise displaying one or more widgets associated with the levels, wherein the one or more widgets are graphically different from each other.

In certain embodiments, the method further comprises a step of placing the pointer near the first widget, which represents the first level. The method may further comprise moving the pointer along the virtual path from the first widget, which represents the first level, to the second widget, which represents the second level, and so forth. The pointer can be moved to the second widget representing the subsequent level, which was unlocked. The virtual path can be also associated with a virtual map.

In certain embodiments, the method further comprises a step of providing a long-term challenge for the player to complete at least five tasks to collect a predetermined reward. The long-term challenge can be valid for a predetermined period in a range from 1 hour to 24 hours. The long-term challenge can contain the task to make an online monetary transaction.

In certain embodiments, the method further comprises steps of performing an online monetary transaction for a currency amount based on a request of the player and increasing an amount of an in-game currency amount. In some embodiments, the method further comprises a step of providing a lottery game (also referred herein to as "lottery" for simplicity) enabling the player to acquire additional in-game currency.

In certain embodiments, the method further comprises a step of providing a feedback to the player to involve him in the slots adventure game. According to this embodiment, the player is able to rate certain game elements.

Consequently, the player may feel his value for the game developer. Moreover, the player can help improving and adapting the game to his needs and desires.

In certain embodiments, the method further comprises steps of in-game reviewing. This embodiment allows for the player to find a review inside the game. There is no need to look for review out of the game. Furthermore, the players have opportunity to like the shown review which indicates how useful the reviews to them. This is the emotional involvement which is part of the game. Moreover, user-generated content can differentiate a product from another. Players tend to be more loyal to reviews written by players rather than the game creators.

According to yet another aspect of this disclosure, there is provided a non-transitory processor-readable medium having instructions stored thereon. When the instructions are executed by one or more processors, the instructions cause the one or more processors to implement a method, which comprises the steps of: displaying to a player a virtual path for the slots adventure game having multiple levels, wherein each of the levels is associated with one of a plurality of level types; presenting to the player a first level associated with the virtual path, wherein a first slots game of the first level is readily available for the player to play; presenting to the player subsequent levels associated with the same virtual path, wherein the subsequent levels are locked and not initially available for the player to play; receiving from the player a selection to initiate a slots game associated with the first level; displaying to the player a quest task associated with the current slots game; initiating a selected slots game based on the selection of the player; and based on one or more conditions (e.g., associated with an amount of in-game currency collected by the player), enabling passing the levels by unlocking each of the subsequent levels sequentially.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Embodiments are illustrated by way of example and not limitation in the figures of the accompanying drawings, in which like references indicate similar elements and in which:

FIGS. 3 through 14 show various Graphical User Interfaces (GUIs) illustrating a gameplay of a slots adventure game, according to example embodiments;

DETAILED DESCRIPTION OF EXAMPLE EMBODIMENTS

Figure 1:
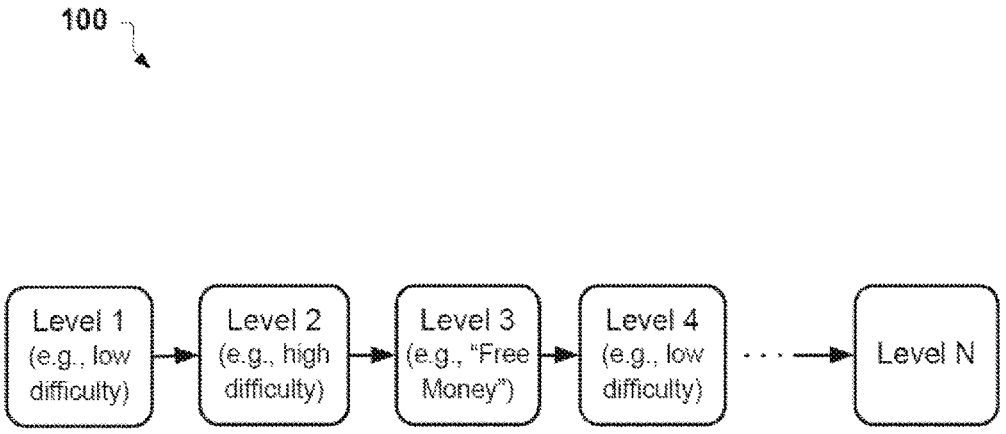
FIG. 1 shows a high-level block diagram of levels through a slots adventure game according to an example embodiment.

The present disclosure describes a slots adventure game "Scatter Slots," and also methods and systems for executing this game. It will be apparent that multiple embodiments of this disclosure may be practiced without some or all of these specific details. In other instances, well-known process operations have not been described in detail in order not to unnecessarily obscure the present embodiments. It is also noted that the embodiments described herein are described with reference to slots games, but the principles may be utilized in other gambling games, including both real-life games and online gambling games. The embodiments described herein should therefore not be interpreted to be exclusive or limiting, but rather exemplary or illustrative.

According to embodiments of this disclosure, the slots adventure game has multiple dimensions combining various levels of different types, adventure features, and quest tasks, all to enhance the player's gaming experience. As will be described below in greater details, a virtual game journey is provided to a player, which includes multiple slots games of varying level types and quest tasks. The first level type is a level with a slots game, which is associated with new slots game availabilities, where the player cannot choose a quest task because only one quest task is available. The subsequent level type is a level of higher difficulty, which is associated with new quest tasks. The next type is a "free money" level, where the player gets a predetermined amount of spins free of charge. Each level type may have its own graphical representation (e.g., an icon). The player has an opportunity to select one of the quest tasks to pass a corresponding level and to advance through the virtual game journey. Upon successful completion of certain quest tasks, the player can also achieve one of predetermined tasks in a long-term challenge, which is associated with a daily challenge (which is an additional option).

Yet another aspect of the slots adventure game is that the levels are separated into two groups: one or more levels are locked (i.e., not available for the player to play) and one or more unlocked levels which are readily available for the player to play. With the advancement through the virtual game journey, the locked levels become unlocked for the player providing him with new quests tasks and new gaming opportunities. Thus, the slots adventure game of this disclosure allows the player creating their own gameplay strategy.

In accordance with example embodiments, an overall process for executing the slots adventure game is as follows. Initially, a player is provided with a virtual path having only one available level with one available slots game with a current quest task. In some embodiments, when there are two or more available slots games, the player can select one of these slots games with the current quest task to play so as to pass the level. Upon successful completion of certain quest task, a next level becomes unlocked and available for the player to play. Simultaneously, the player is advanced through the virtual path giving him more and more gaming opportunities. Moreover, with the advancement through the virtual path, the gameplay can change to even more excitement to the player.

Accordingly, the player can control his advancement through the slots adventure game by choosing quest tasks in current level on his own. The player can access his chances and risks and build his own gaming strategy, which ultimately improves the player's skills. These features of the slots adventure game significantly advance and differentiate it from prior art analogues, which provide simple one-dimensional gaming experiences to the players.

The following description of embodiments includes references to the accompanying drawings. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to." Additionally, all ranges provided herein include the upper and lower values of the range unless explicitly noted. For example, the term "about" shall mean a reasonable deviation of a value accompanying this term. If it is not specified otherwise, the term "about" refer to a variation of 10% from an indicated value. In the case of a range of values, the term "about" may refer to a 10% variation from both the lower and upper limits of the range. The term "player" shall mean a user of a computer, user device, spin machine or any other device enabling the user to play a slots adventure game of this disclosure. The term "in-game currency" shall mean virtual currency such as game points (or game experience points, coins, gems, etc.), which can be collected, acquired, spent, purchased, etc. during a gameplay of a slots adventure game of this disclosure.

FIG. 1 shows a high-level block diagram 100 of a path for a slots adventure game, according to an example embodiment. With the advancement through a virtual game journey, level types and difficulty are changed from Level 1 to Level 2, then from Level 2 to Level 3, and so on up to Level N. A virtual game journey is the player's progressing from one level to another by completing the quest tasks. In some embodiments, the difficulty levels can gradually change, thereby increasing the quest task complexity from one level to another. In other embodiments, however, the complexity of the quest task is not changed gradually, but rather in a predetermined or arbitrary manner. For example, Level 1 can be of low complexity, Level 2 can be of high complexity, Level 3 can be of moderate complexity, Level 4 can be of easy complexity, and so forth. Moreover, with the advancement from one level to another, the player can be provided with new types of quest tasks. Accordingly, each level of slots games available in the slots adventure game can be assigned with a predetermined difficulty level.

Figure 2:
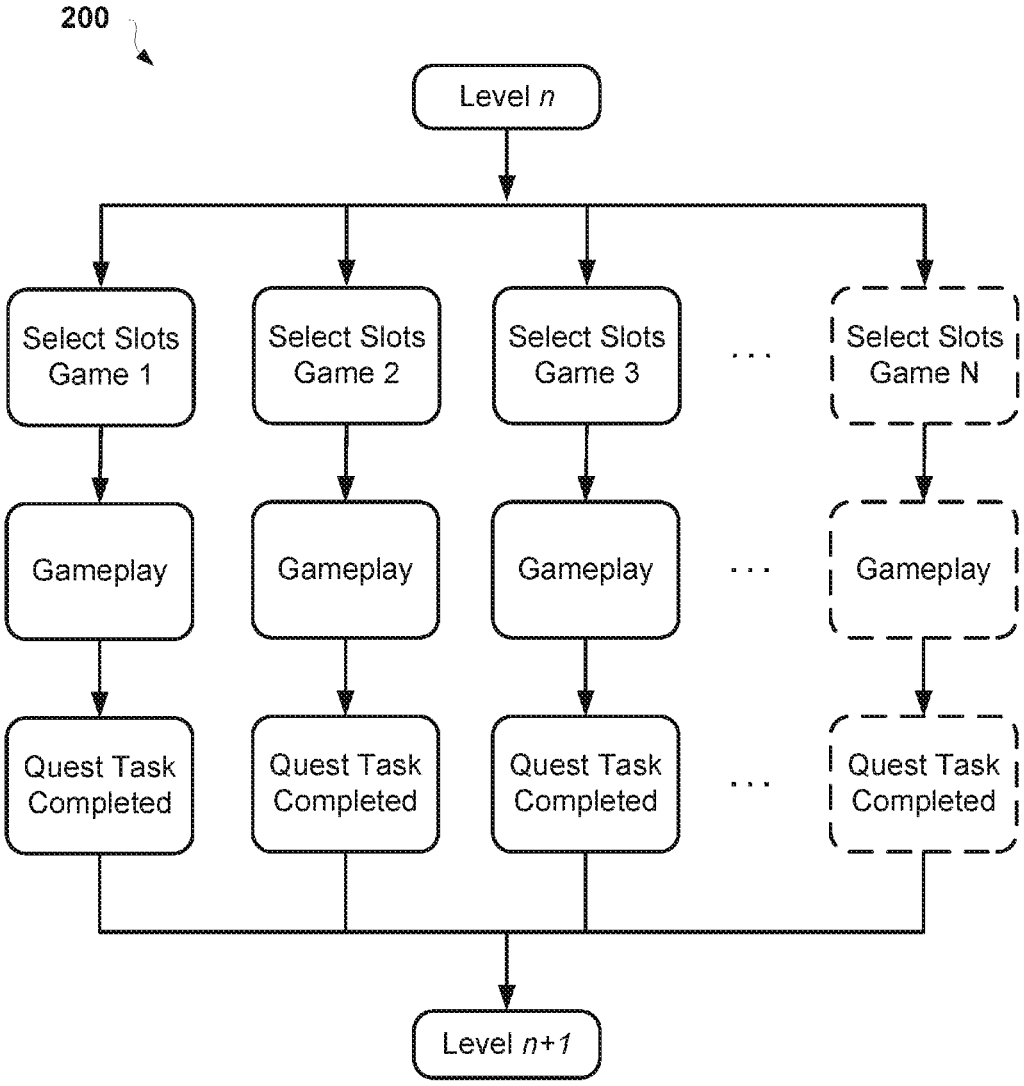
FIG. 2 shows a flow chart illustrating a scheme of passing a level according to an example embodiment.

FIG. 2 shows a flow chart illustrating a scheme 200 of passing a level according to an example embodiment. As depicted in this figure, with achieving a certain level "n," the player can be provided with an opportunity to select only one quest task in a current slots game from a plurality of slots games 1 through N. Each of slots games 1 through N has its own quest task. For example, quest tasks can include goals for making a predetermined number of spins, achieving a predetermined number of icon images, collecting a predetermined number of in-game currency (e.g., game points), and so forth. The number of slots games N with a particular quest task can vary from one to any reasonable number. Therefore, in order for the player to achieve the next level "n+1," the player has to successfully complete one of quest tasks 1 through N. Moreover, each of slots games 1 through N has its own graphical representation and certain game features, incentives, bonuses, challenges, and so forth.

In operation, once the player selects one of the slots games 1 through N, the player is provided with a quest task of the selected slots game. There are different types of quest tasks (e.g., to make a predetermined number of spins with a maximum available bet). Further, during a gameplay, the player tries to complete the quest task of the selected slots game. When the player successfully completes the quest task, the level advances from level "n" to "n+1." When the player cannot successfully completes the quest task in the selected slots game, the player may select another slots game from the slots games 1 through N with the current quest task. For example, there is possibility for the player to make a decision between two slots games, where quest tasks in both slots games are the same (e.g., to spin 100 times). However, in the first slots game, a minimum bet is 25,000 coins (i.e., in-game currency), while in the second slots game a minimum bet is 40,000 coins. Thus, the player can use his skills and decide which slots game is better to play. In other example embodiments, quest tasks of two or more slots game within one difficulty level can differ. Accordingly, the scheme 200 provides the opportunity for the player to create his own game strategy and enhances the gaming experience.

In certain embodiments, when achieving a level with a new slots game, the player cannot select a slots game to play. Instead, new slots games can be automatically activated for the player to play. In yet more embodiments, the player is enabled to complete the current level when passing the quest task of this level. The "opening" level means a quest task, the successful completion of which unlocks one of previously locked levels on the virtual path 305 (see FIG. 3). In some embodiments, quest tasks of slots games can be identical at the same level. When the player understands he cannot finish a particular quest task in a current slots game, he can choose another quest task in the current slots game. The progress of each quest task is unique and cannot be moved to other quest task. For example, there are two options for choosing a quest task, which is associated with a certain slots game. The player can choose slots game No. 1 with a quest task to win 100,000 coins during "Free Spins." When a certain percentage of the quest task is completed, the player can recognize he wants to change the slots game and/or quest task to another one. In this case, the player can start a new quest task, but the progress in the new quest task will be 0%. In certain embodiments, there is no opportunity for the player to restart already completed quest task and completed levels. In yet another embodiment, the player cannot start the next level before completing required quest task of the current level.

Figure 3:
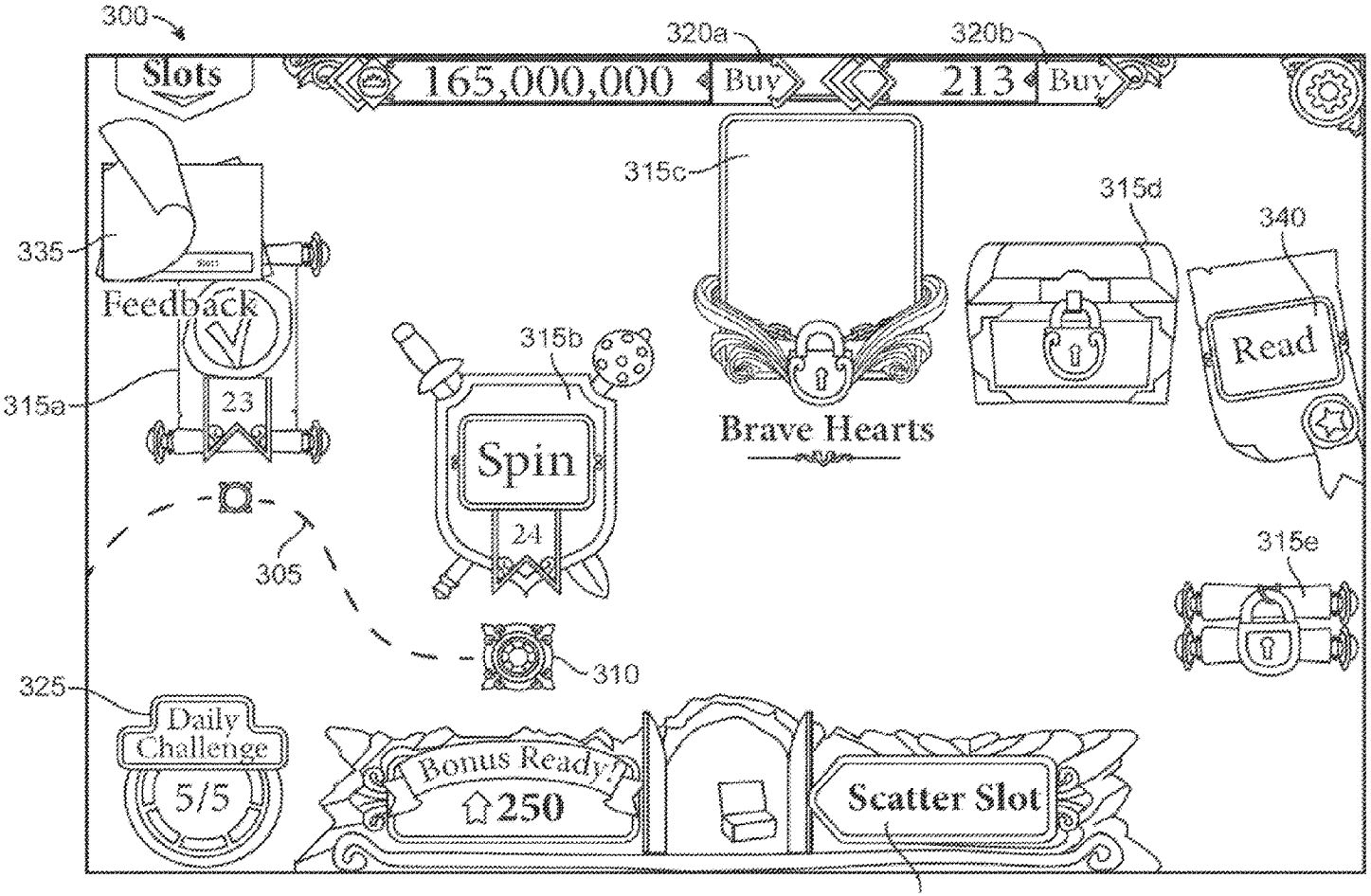
Figure 4:
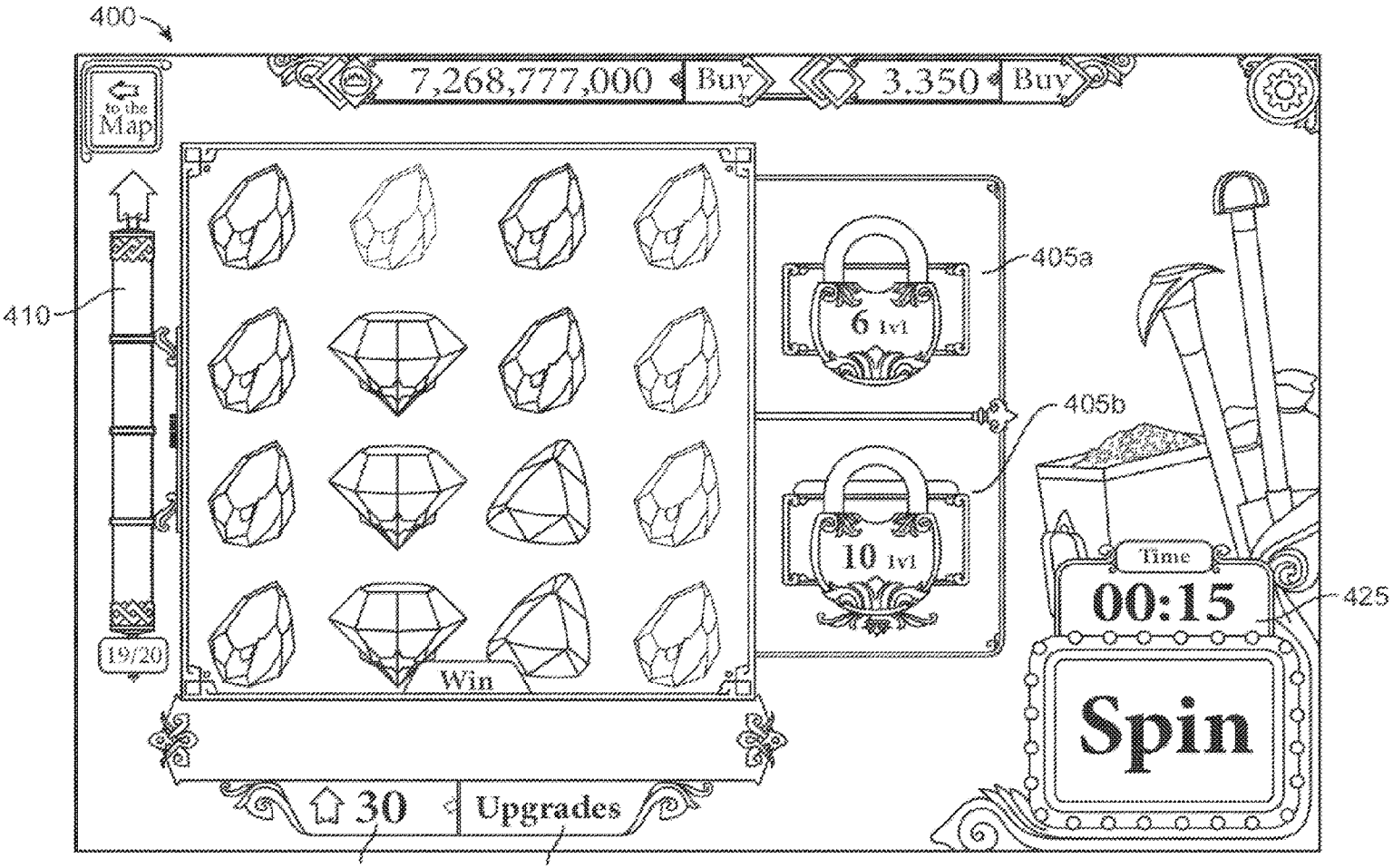
Figure 5:
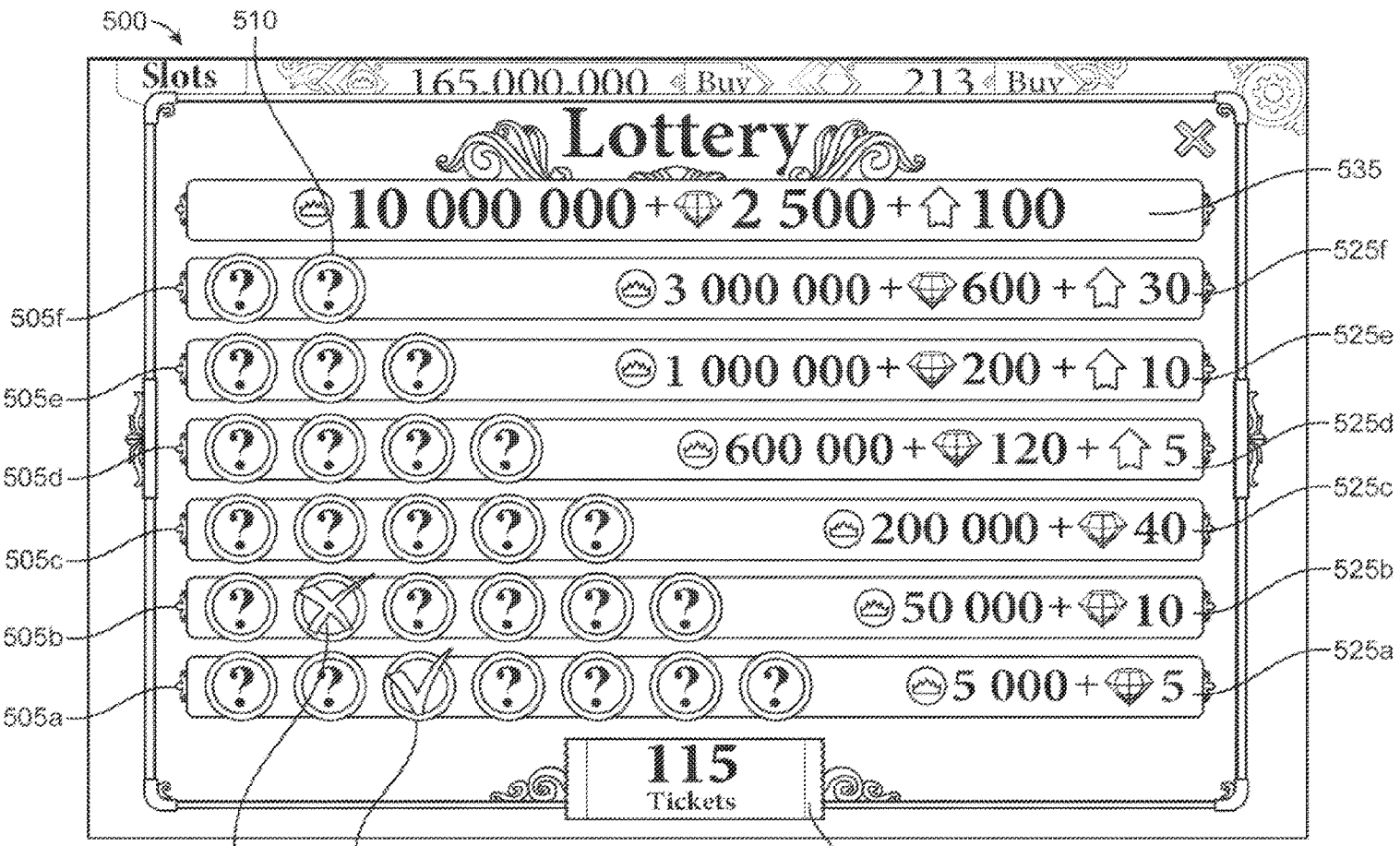
Figure 6:
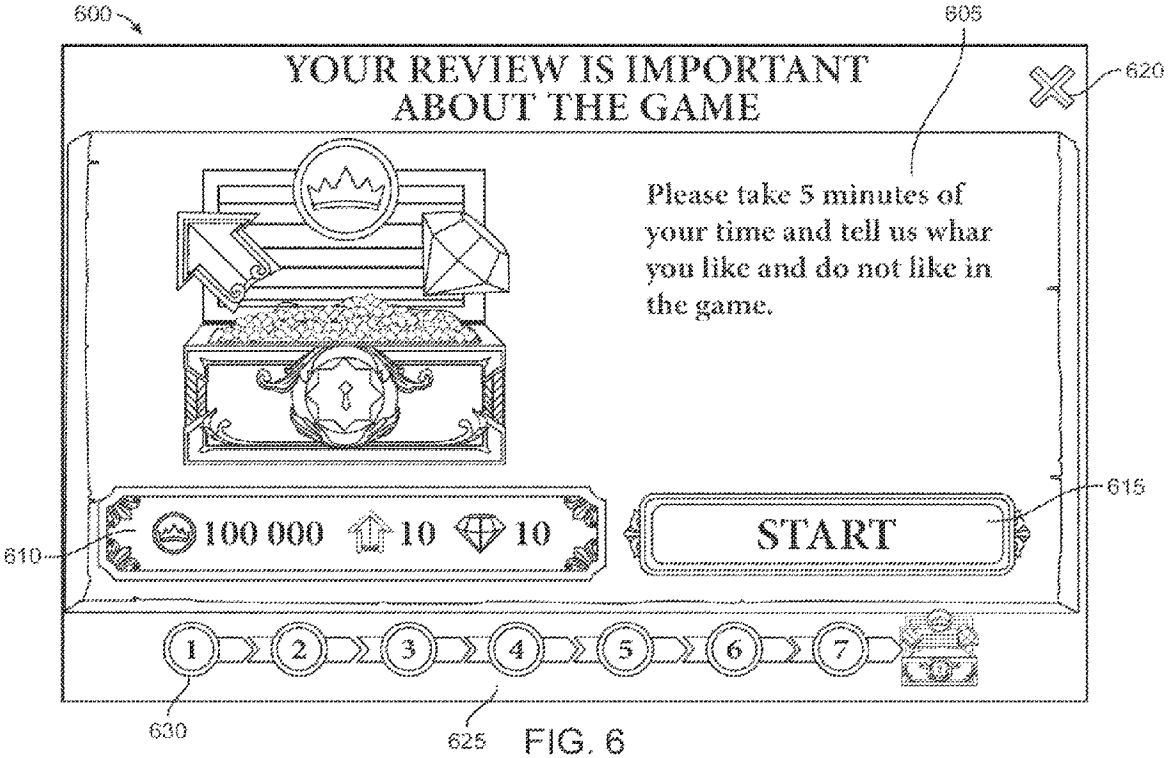

FIG. 3 shows a GUI 300 for playing a slots adventure game according to one embodiment. As shown in this figure, the GUI 300 includes a virtual path 305 with a pointer 310. The virtual path 305 can be shown as a path on a background map. The pointer 310 shows a current advancement in the slots adventure game by a player. Moreover, there are shown multiple widgets 315a through 315e associated with different levels or different level types. The term "widget," as used herein, shall mean a graphical representation, such as an icon, associated with a certain element of a GUI. The widgets 315a through 315e are linked (associated) to the virtual path 305. In certain embodiments, levels are initially locked. The locked levels can be represented by widgets 315c, 315d, and 315e, which are shown with an optional lock image. The widget 315a illustrates a successfully completed level. The widget 315b illustrates an unlocked level (e.g., it is a first level or a level unlocked after the player successfully completed the previous level).

Accordingly, the pointer 310 can move from one of the widgets 315a-315e to a corresponding subsequent widget 315a-315e according to the path 305. In certain embodiments, the movement of the pointer 310 can be performed only after successful completion of a level by completing a quest task. For example, when the player successfully completes the level by completing the quest task associated with the widget 315a, the pointer automatically advances along the virtual path 305 to the next game associated with the widget 315b.

The GUI 300 further includes a widget 325 associated with a long-term challenge, which is associated with daily challenge. The long-term challenge can be provided to the player and be valid for a predetermined period. In one example, the period can be 24 hours, which means that the player has to complete the long-term challenge within 24 hours to get a predetermined reward (e.g., a certain amount of in-game currency). The period can generally vary within any reasonable boundaries, and preferably be within one hour to 24 hours.

When the player clicks or pushes the widget 325, a new GUI is provided and the player sees a list of tasks to be completed. For example, there can be five tasks, although any other number of tasks is possible to employ. With the progress of completing these tasks, the widget 325 can be graphically modified to reflect the number of completed tasks. For example, five tasks should be completed, initially the widget 325 can display "0/5" meaning that none of the tasks of the long-term challenge are completed. The widget 325 displays "5/5" when all of the tasks of the long-term challenge are completed (see FIG. 3).

The long-term challenge can include any reasonable number of tasks for the player. For example, the tasks can include one or more of the following: a task to make a predetermined number of reel spins, a task to complete the level, a task to play Bonus Game during a slots game, a task to get Free Spins during a slots game, a task to play a bonus slots game, which is associated with "Scatter Slot" game, a task to play with Max Bet during a slots game, a task to make a purchase by making a monetary transaction. It is to be noted that the number and nature of tasks for each long-term challenge can vary. Accordingly, the game adventure game can provide the player with multiple tasks, which may differ from each other.

The GUI 300 further includes a widget 330 associated with a "Scatter Slot" game, which is a slots game but not linked to the virtual path 305. Accordingly, when the player clicks or pushes the widget 330, a new GUI 400 is provided allowing the player to play "Scatter Slot" game, which is associated with an additional slots game (having multiple slots reels), where the player can spin during a predetermined period (e.g., 30 seconds). The player can observe the widget 425 showing elapsed time. The periodicity can vary within any reasonable boundaries. The "Scatter Slot" game is a game with its own mechanic, where there are two additional locked widgets 405a and 405b. These reels can be unlocked, when the player achieves the current levels, which may be predetermined. To unlock the widgets, the player has to complete the tasks (e.g. make social media connection, make an in-game purchase, or watch an advertisement message). The number of additional widgets and tasks conditions can vary.

There is an opportunity to upgrade symbols in the "Scatter Slot" game using upgrade points, which the player gets when he plays the "Scatter Slot" game and as a part of reward when completing long-term challenge and the quest task. For example, to get one upgrade point, the player should play the "Scatter Slot" game two times. The number of play instances of the "Scatter Slot" game to get one upgrade point increases from one "Scatter Slot" game played to any reasonable amount. The progress of getting one upgrade point is shown in an upgrade meter widget 410 (e.g., a progress bar) that gradually fills up with a color gradient, when the "Scatter Slot" game is played.

In certain embodiments, the "Scatter Slot" game is available once an hour. The periodicity can vary within any reasonable boundaries. When the player clicks or pushes the widget 415, a new GUI is provided and the player is enabled to upgrade the "Scatter Slot" game symbols. Also, the player is provided with widget 420 showing a number of available upgrade points.

The GUI 300 has actionable buttons 325a, 325b which, when clicked or pushed, allow the player to purchase in-game currency in a buy menu. The purchase can contain additional bonuses. For example, when purchasing a position for $14.99 in the buy menu, a special bonus-like lottery game is provided by a GUI 500. The amount of included lotteries can vary. The lottery consists of predetermined amount of line widgets 505a-505f and predetermined amount of items 510 in each line widget. First, the player has to choose one item from the first line. Each line contains only one correct item. If the player chooses the correct item, which is graphically represented with a special sign (e.g., a tick) widget 515, he continues the game which means he moves to the next line and chooses the item again. The game lasts till the player chooses an incorrect item, which is graphically represented with a special sign that differs from the correct item (e.g., a cross) 520. Each line 505 contains a predetermined reward, which can increase from line to line widgets 525a through 525f. Also, the player is provided with the amount of left lotteries widget 530 (e.g., a number of tickets). When the player passes the last line, the player is provided with a special predetermined reward widget 535.

The GUI 300 has also an actionable button 335 which, when clicked or pushed, a new GUI 600 is provided with preposition to leave a feedback message 605 by the player, where a consideration for the feedback is a predetermined reward 610 (e.g., a predetermined amount of in-game currency). There is an option to provide a feedback (or rating) upon pushing an actionable button 615 or to return to the game by clicking a button 620.

Figure 7:
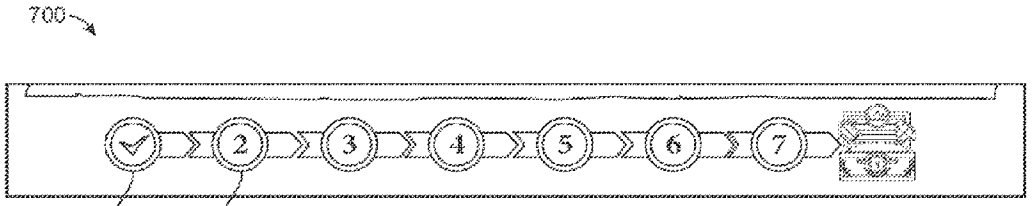
Figure 8:
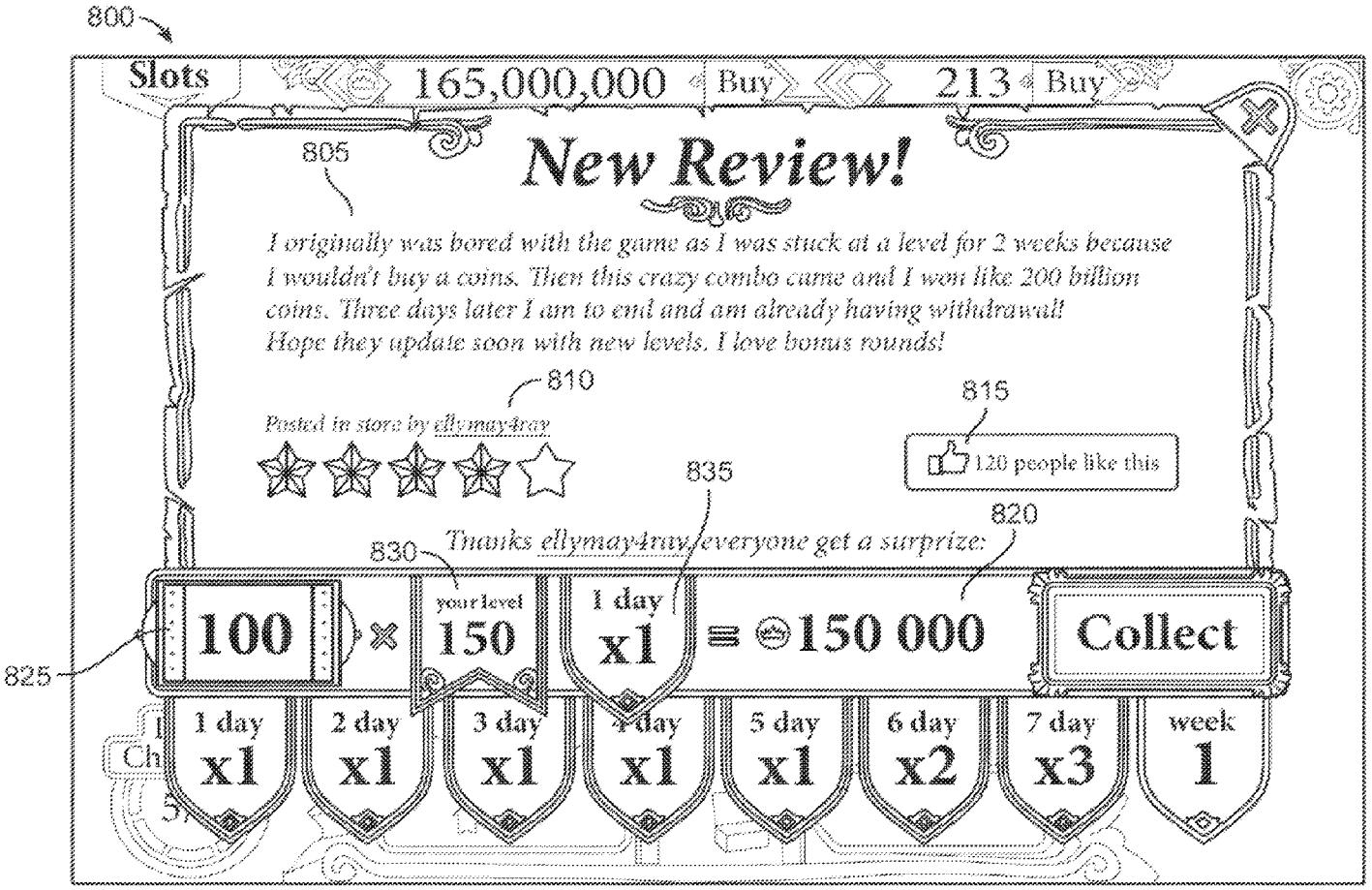

The process for providing feedback has a predetermined number of steps 625. When these steps are in progress, it is graphically represented with a colored mark 630 (e.g., a yellow sign). For example, as shown in FIG. 7, there is a GUI 700, which is substantially similar to steps 625 in GUI 600; however, the colored mark 630 was converted into a "tick" mark 705 notifying the player that this step was successfully completed and the player moves to the next step 710.

In some embodiments, the feedback can contain different types of questions and require the player to answer a questionnaire. For example, the questions about the player's attitude and impression, observations, elements of the game, graphics, features, and the like.

In addition, the feedback may include a wide range of answers. For example, there is an opportunity for the player to rate certain game features or game elements by giving a rank from 1 to 5; or the player has an option to select one of the offered answers.

If the feedback involves a predetermined reward, the player gets it when he provides his feedback. The player can be asked to rate the game at the end of the feedback.

In certain embodiments, the GUI 300 has an actionable button 340 which, when clicked or pushed, causes a new GUI 800 to be provided and a review interface is showed to the player to enable him to appreciate a surprise message and acquire in-game currency of a certain amount according to the reward.

The GUI 800 further includes a widget 805 associated with the text of the review, which can be animated and written successively. There is also information about an author of the review message and his game rate at widget 810. Moreover, there is provided widget 815 to display a number of "likes" of the review.

In some embodiments, the reward can be a product of several components 820, which are mini-slots game 825, where one of the values of in-game currency falls out to the player, the current level of the player 830, and the gaming day of the player 835.

In some embodiments, a new review option is available to the player once in 24 hours. FIG. 9 shows a GUI 900 displayable to the player upon successful completion of a level and the quest task. The GUI 900 invites the player to select one of the quest tasks in a current slots game. In particular, the GUI 900 includes an informational widget 910 displaying a notice of successful completion of a slots game with final results. According to some embodiments, the results include predetermined reward 915. The GUI 900 includes two widgets 905a, 905b associated with two independent slots games, which have quest tasks. For example, one of the slots games is the "Wild Arrow" slots game with a bonus game quest task and the other one is the "Frozen Flame" slots game also with a bonus game quest task. The player is able to choose one of the quest tasks in the current slots games. When the player clicks or pushes one of the widgets 905a, 905b (or corresponding button "Play"), he enters the slots game and a description of the quest task is shown to the player.

Figure 10:
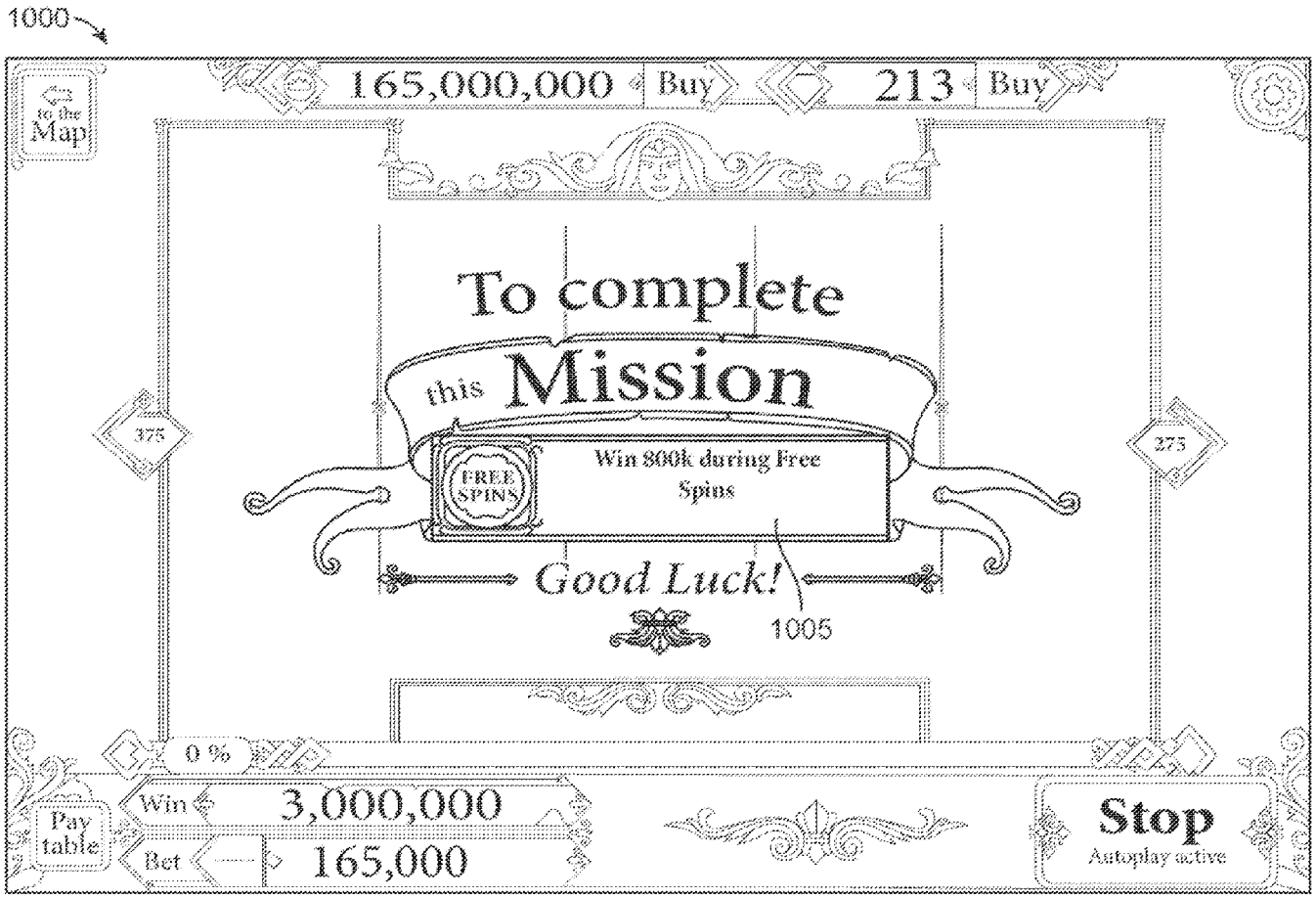

FIG. 10 shows an example GUI 1000 illustrating a description of the selected quest task in the current slots game, according to one example embodiment. As shown in this figure, the GUI 1000 includes a widget 1005 showing a quest task. In this example, the quest task includes a task to win 800,000 "coins" during the "Free Spins" in slots game. The quest task is activated in a few seconds after the description is shown. When the quest task is activated, start level animation is displayed (see FIG. 11). If it is a limited time quest task, it is activated after clicking or pushing the "Spin" button.

Figure 11:
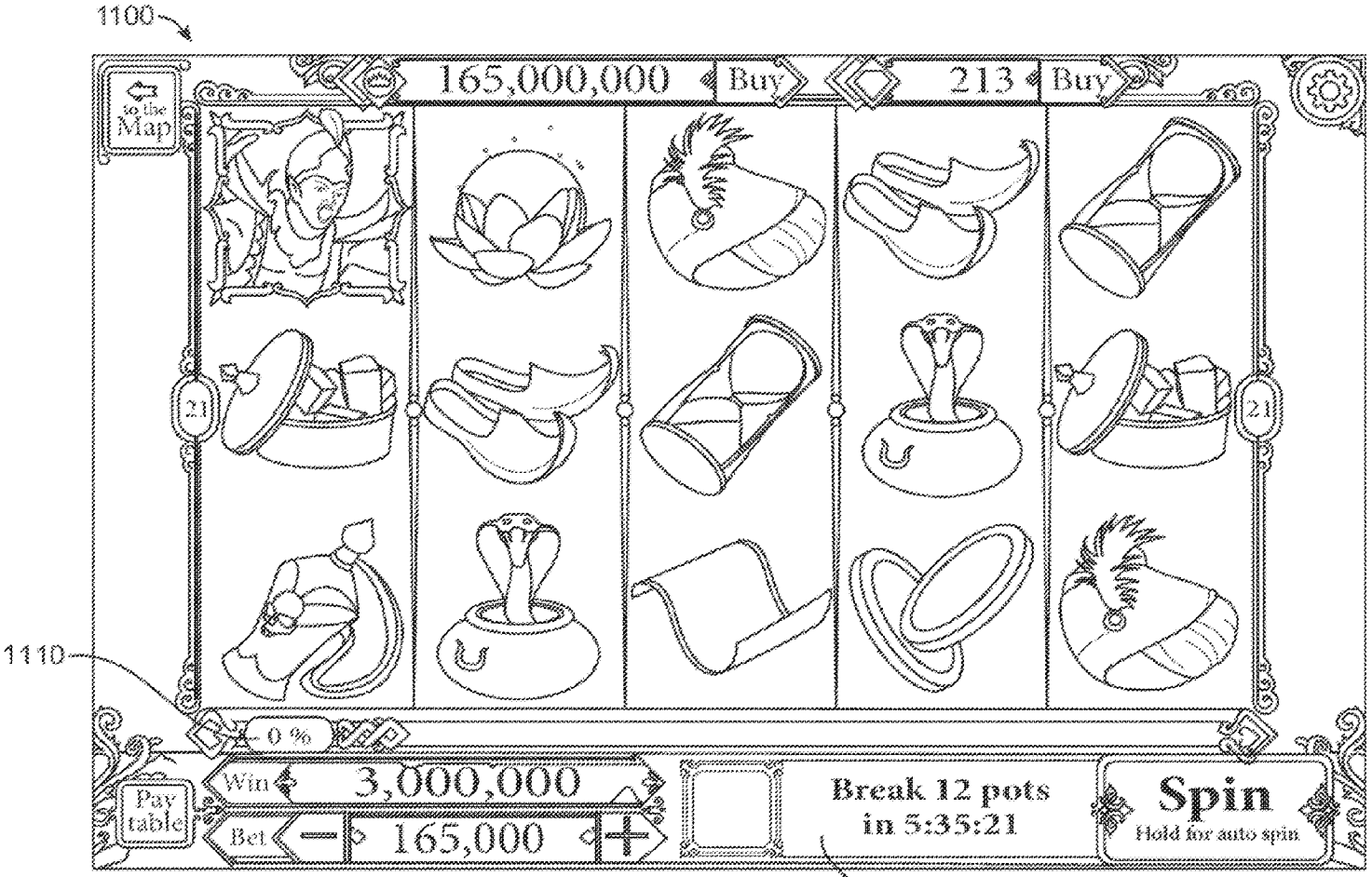

FIG. 11 shows an example GUI 1100 illustrating a slots game with a particular quest task, according to one example embodiment. The GUI 1100 includes a widget with multiple reels which can be rotated during a gameplay. The GUI 1100 includes a widget 1105 for showing a quest task or any other predetermined message. The GUI 1100 has a progress bar 1110 for showing a progress of the quest task in the selected slots game based on the advancement of the quest task. The progress of the quest task can be shown in percentages (e.g., from 0% to 100%). Thus, initially, the progress level is set to 0%, but with the advancement of the game, the progress level moves toward 100%.

Figure 12:
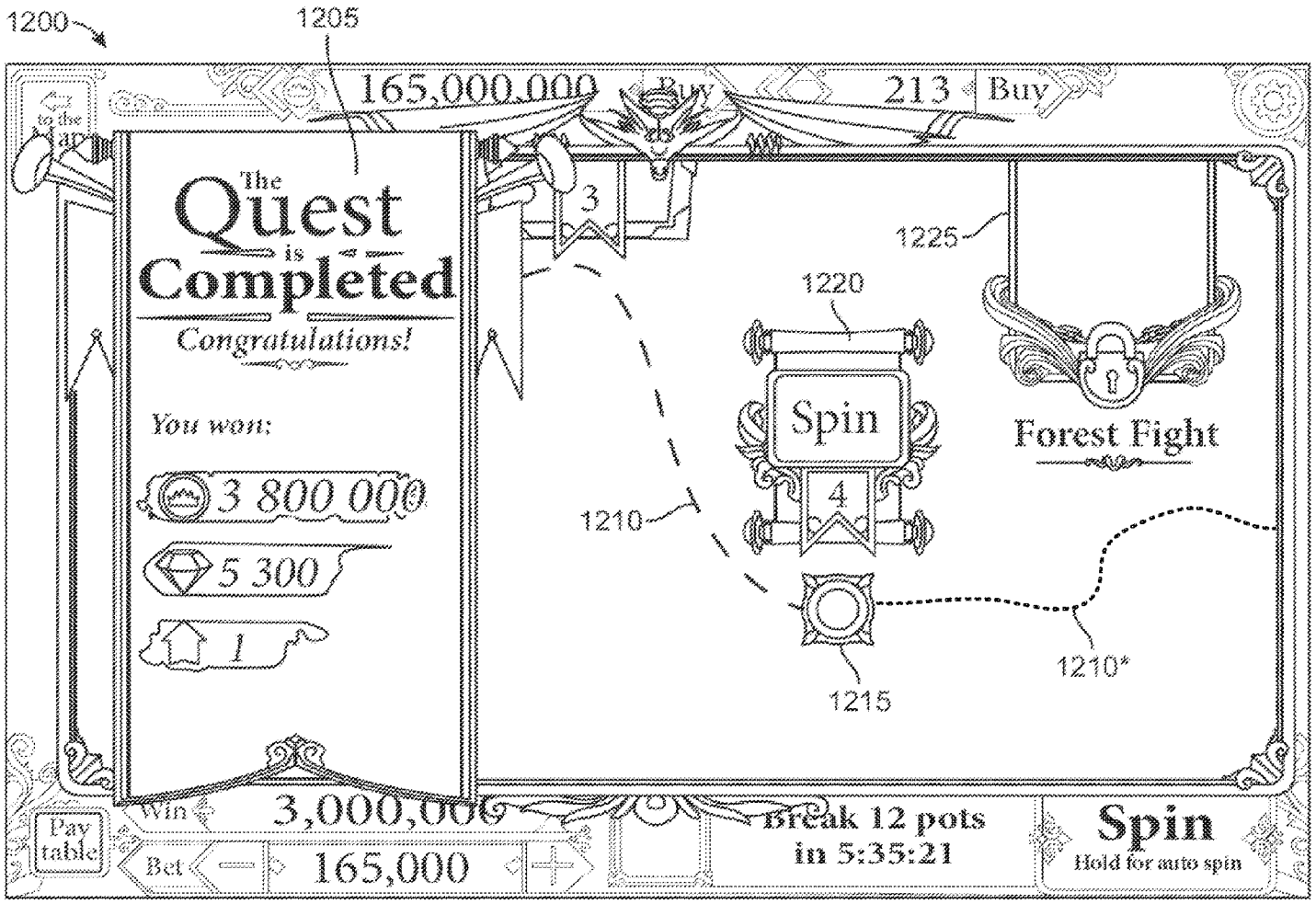

FIG. 12 shows a GUI 1200 displayable to the player upon successful completion of the quest task and a corresponding level, according to one example embodiment. The GUI 1200 includes informational widget 1205 showing information about successful completion of a certain quest task and the level with the information of a total reward. The GUI 1200 further includes a virtual path 1210 with a pointer 1215 placed near a current unlocked level widget 1220. The GUI 1200 also includes at least one locked slots game widget 1225. The locked level becomes available to the player when he successfully completes the previous level associated with the widget 1220.

In other embodiments, the widgets 1220 and 1225 can be associated with different types of levels, where each of the levels types can have one or more quest tasks associated with current slots games. It should be also noted that the virtual path 1210 can graphically differentiate the levels, which were already completed, and the levels, which are locked and/or not-completed by the player. In particular, there can be shown unfilled virtual path 1210* to designate the area of locked and/or non-completed part of the path.

Figure 13:
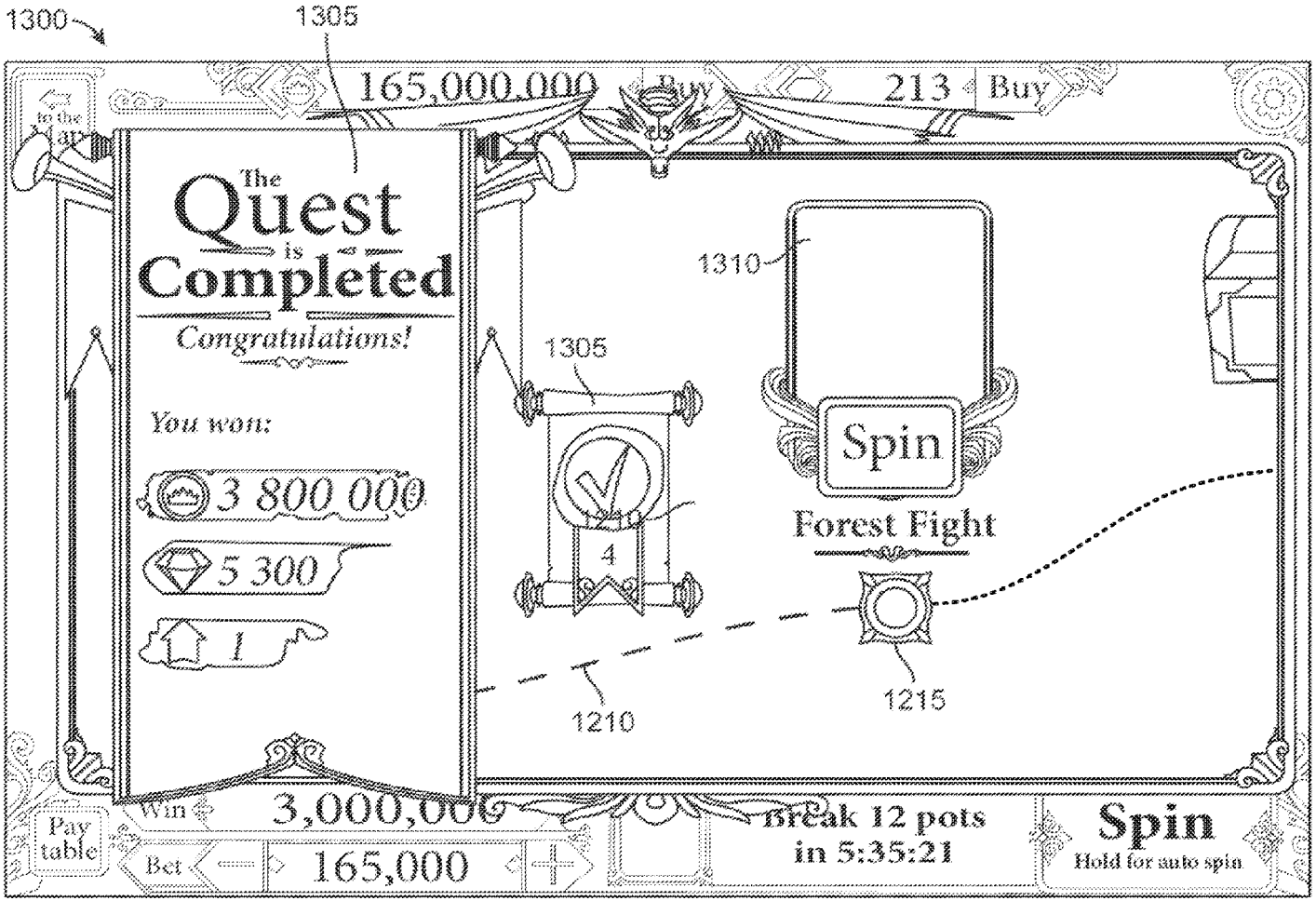

To initiate a level, the player should touch, click, or push the widget 1220. Once the level associated with the widget 1220 is successfully completed, the graphical representation of the widget 1220 can change. For example, as shown in FIG. 13, there is a GUI 1300, which is substantially similar to the GUI 1200; however the widget 1220 was converted into a widget 1305 with a "tick" mark notifying the player that this level was successfully completed and that a corresponding quest task was solved. Moreover, the GUI 1300 has a widget 1310, which was previously the widget 1225. The widget 1310 represents an unlocked level. Accordingly, the widget 1310 is graphically different from the widget 1225. Furthermore, upon completion of the level 1305 (previously unlocked level associated with widget 1220), the pointer advances along the path 1210 towards the level widget 1310 (previously locked level associated with widget 1225).

Figure 14:
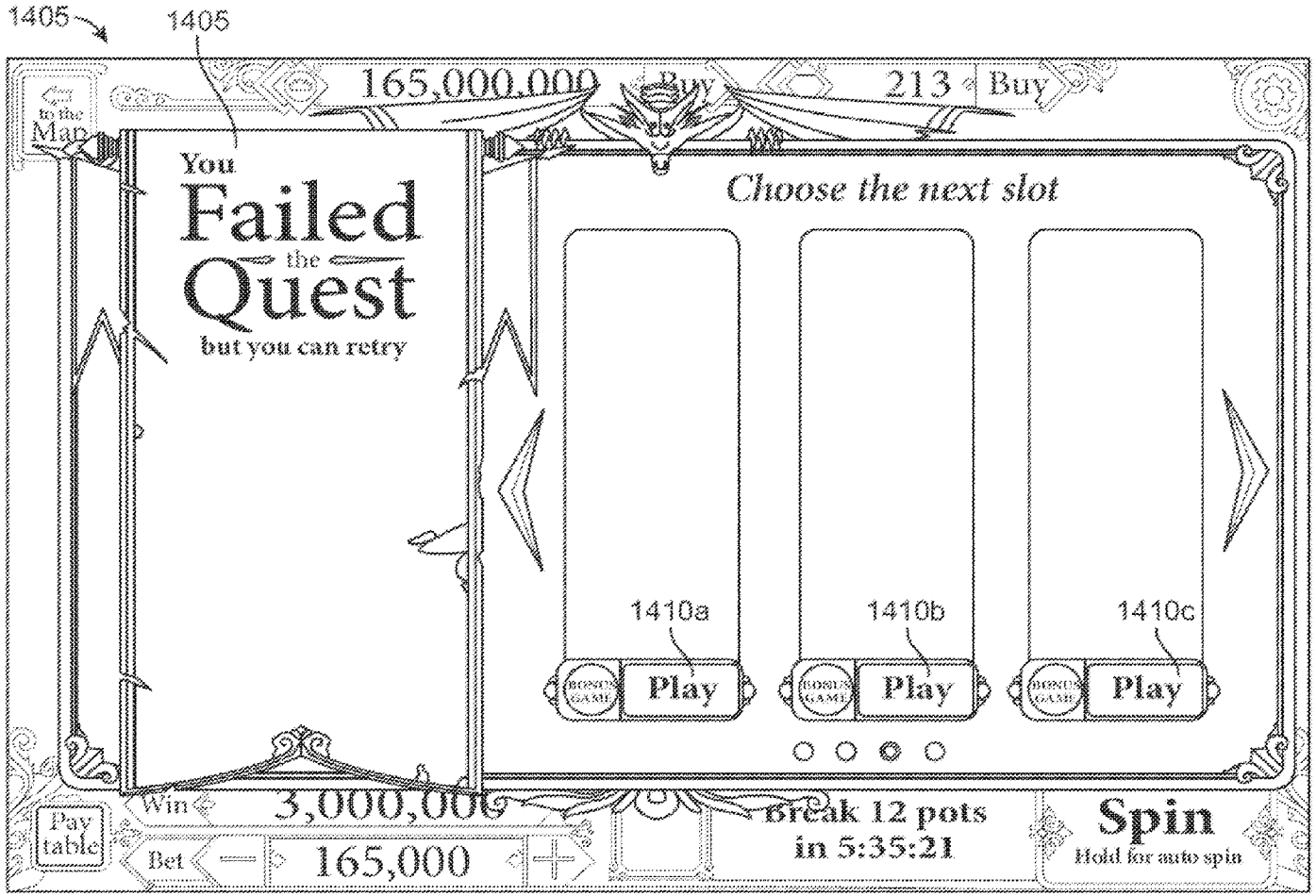

FIG. 14 shows a GUI 1400 displayable to the player upon unsuccessful completion of a level, according to one example embodiment. Here, the GUI 1400 includes an informational widget 1405 informing the player that he failed the quest task of the slots game. The GUI 1400 also includes one or more slots game with current quest tasks widgets 1410a through 1410c. Similar to FIG. 9, when the player clicks or pushes one of the widgets 1410a-1410c (or corresponding button "Play"), the player enters a slots game after a description of a corresponding quest task is shown.

Figure 15:
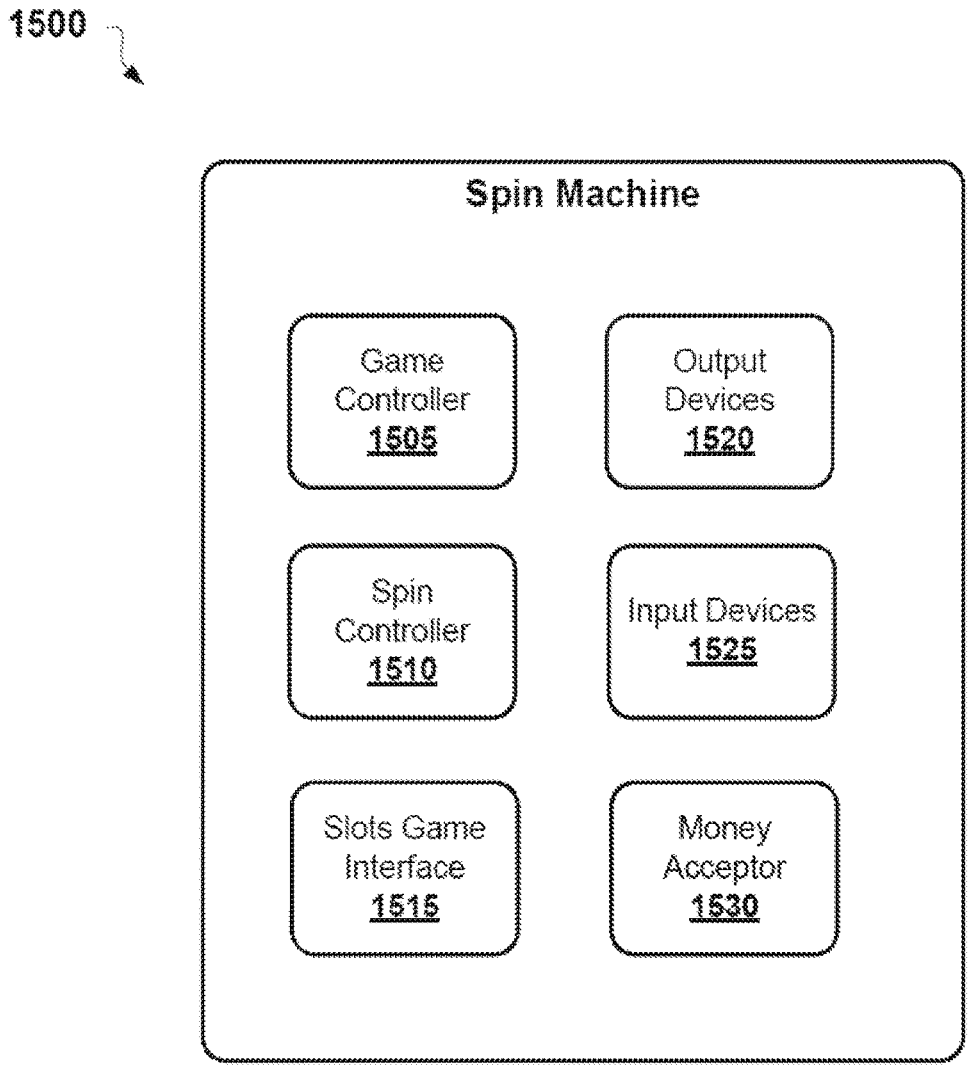
FIG. 15 shows a high-level block diagram of a spin machine suitable for executing a slots adventure game according to one example embodiment.

FIG. 15 shows a high-level block diagram of a spin machine 1500 suitable for executing a slots adventure game according to one example embodiment. Generally, the spin machine 1500 can refer to land-based apparatus for executing a slots adventure game. For example, the spin machine 1500 can refer to a semi-mechanical or computer-based apparatus operatively combining various electrical-driven modules as follows. In some embodiments, the spin machine 1500 can refer to a computing device (e.g., a personal computer, desktop computer, and tablet computer), smart phone, cellular phone, server, game console, and so forth.

As shown in the figure, the spin machine 1500 includes a game controller 1505 and a spin controller 1510, both of which can be implemented using a variety of technologies. For example, the game controller 1505 and the spin controller 1510 may be implemented in software on a computer system or in hardware utilizing one or more processors, microprocessors, CPUs, controllers, other specially designed application-specific integrated circuits (ASICs), programmable logic devices, memory, or various combinations thereof. In one example, the game controller 1505 and the spin controller 1510 can include a series of processor-executable instructions residing on a transitory or non-transitory storage medium such as a disk drive or computer-readable medium. In other example embodiments, the game controller 1505 and the spin controller 1510 include a plurality of logic devices and/or ASICs for implementing substantially the same functionality as the software-based solutions. In yet more embodiments, the game controller 1505 and the spin controller 1510 are represented by a single computing device.

The spin machine 1500 further includes a slots game interface 1515, which can include a plurality of mechanical (tangible) slots reels, which are configured to spin upon receiving a control instruction from the spin controller 1510. In alternative embodiments, the slots game interface 1515 can refer to a graphical interface displayed on a screen, where the graphical interface includes motion images of virtual slots reels. In either example, the slots game interface 1515 enables slots reels to spin and stop, such that predetermined reel image combinations can be determined to detect if the player has a winning combination.

The spin machine 1500 further includes one or more output devices 1520. Depending on the nature of the spin machine 1500, the output devices 1520 can include one or more of the following: a display, touch screen display, lighting devices, speakers, printer, prize delivery system, communications port, and so forth. The description of these elements is not given so as not to complicate the present disclosure, and it shall be clear that any available output devices known in the art can be used.

The spin machine 1500 further includes one or more input devices 1525. Depending on the nature of the spin machine 1500, the input devices 1525 can include one or more of the following: a keypad, keyboard, trackball, buttons, lever, microphone, video camera, communications port, and so forth. The description of these elements is not given so as not to complicate the present disclosure, and it shall be clear that any available output devices known in the art can be used.

The spin machine 1500 may also include, but optionally, a money acceptor 1530, which is configured to access and facilitate any monetary or non-monetary transactions, such as for purchasing in-game currency. In one example, the money acceptor 1530 is configured to accept, recognize and collect cash or coins. In another example, the money acceptor 1530 can be configured to access and process transactions with credit or debit cards, bank cards, reward cards, and so forth.

The above-described modules of spin machine 1500 can work in aggregate thereby executing a game adventure game. More specifically, the game controller 1505 can start with causing a display device (i.e., output device 1520) to display to a player a virtual path for a slots adventure game having multiple slots games. The game controller 1505 is further configured to present to the player one or more slots games (e.g., from unlocked levels) linked to the virtual path. The game controller 1505 is further configured to receive from the player a selection, for example, by receiving a player's input made via one of the input devices 1525. Upon receiving the player's selection, the game controller 1505 can initiate one of the slots games.

Further, upon receiving an initiation instruction from the game controller 1505, the spin controller 1515 is configured to start the selected slots game based on the selection of the player and cause displaying via one of the output devices 1520 a quest task associated with the selected slots game (such as shown in FIG. 10). Further, the spin controller 1510 can receive one or more bets placed on the selected slots game by the player via at least one of the input devices 1525. The spin controller 1510 then causes slot reels to spin based on the one or more bets and a command received from the player via one of the input devices 1525 (e.g., when the player pushes a button "Spin" or pulls a lever).

Further, the game controller 1505 is configured to calculate in-game currency based on a number of spinning events, the one or more bets, and/or one or more predetermined game rules. The game controller 1505 determines whether or not the in-game currency exceeds a predetermined threshold amount of in-game currency. If the in-game currency exceeds the predetermined threshold amount of in-game currency (or any other predetermined condition is satisfied), the game controller 1505 unlocks a subsequent level with one or more slots games. The unlocking can be accompanied with presenting one or more visual and/or one or more audio effects caused by the game controller 1505. In certain embodiments, the game controller 1505 can cause delivering visual and/or audio effects during a gameplay.

Figure 16:
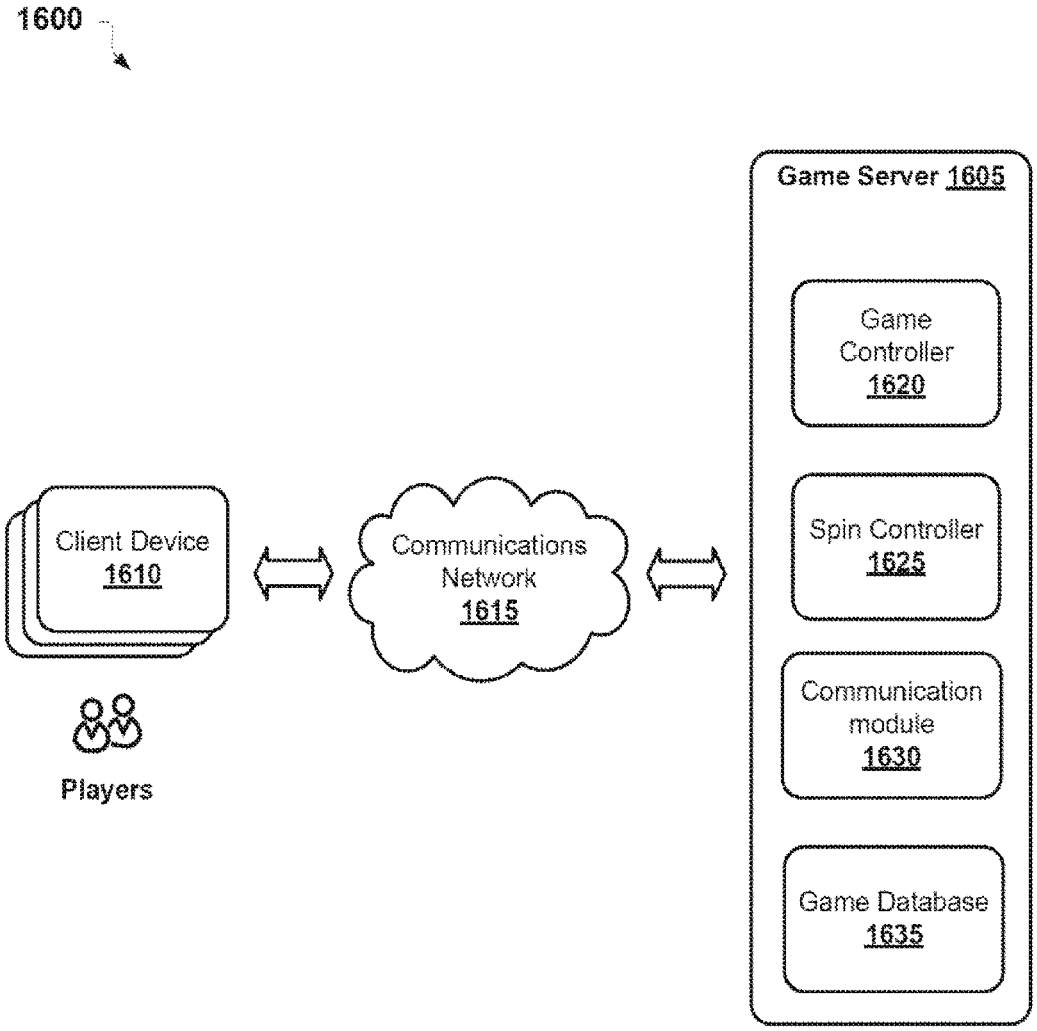
FIG. 16 shows a high-level block diagram of a computer network environment suitable for executing a slots adventure game according to one example embodiment.

FIG. 16 shows a high-level block diagram of a computer network environment 1600 suitable for executing a slots adventure game according to one example embodiment. The environment 1600 includes a game server 1605 suitable for implementing online gaming for one or more players. The players use client devices 1610, which can refer to any suitable electronic device with networking capability. Some examples of client devices 1610 include, inter alia, a personal computer, desktop computer, tablet computer, smart phone, cellular phone, personal digital assistant, game console, television system, and so forth. The client devices 1610 communicate with a communication module 1630 of the game server 1605 via a communications network 1615. The communications network 1615 may include, for example, the Internet, local intranet, PAN (Personal Area Network), LAN (Local Area Network), WAN (Wide Area Network), MAN (Metropolitan Area Network), virtual private network (VPN), DSL (Digital Subscriber Line) connection, Ethernet connection, ISDN (Integrated Services Digital Network) line, cable modem, ATM (Asynchronous Transfer Mode) connection, or an FDDI (Fiber Distributed Data Interface) or CDDI (Copper Distributed Data Interface) connection. Furthermore, communications may also include links to any of a variety of wireless networks including WAP (Wireless Application Protocol), GPRS (General Packet Radio Service), GSM (Global System for Mobile Communication), CDMA (Code Division Multiple Access) or TDMA (Time Division Multiple Access), CDPD (cellular digital packet data), Bluetooth radio, or an IEEE 802.11-based radio frequency network. Accordingly, the communication module 1630 can include a network interface to cause communication with the client devices 1110 using, for example, Transmission Control Protocol/Internet Protocol (TCP/IP) protocols.

The game server 1605 includes a game controller 1620 and a spin controller 1625, which can provide substantially the same or similar functionality as the game controller 1505 and the spin controller 1510, respectively, as described above with reference to FIG. 15. In particular, the game server 1605 and the spin controller 1625 can be configured to execute the slots adventure game functionality. In certain embodiments, the game controller 1620 and the spin controller 1625 can be implemented as a combination of hardware modules and software modules. For example, each of the game controller 1620 and the spin controller 1625 can be implemented as a computing device having one or more processors and one or more memories storing computer-executable codes causing the game controller 1620 and the spin controller 1625 to execute the slots adventure game. In some embodiments, both the game controller 1620 and the spin controller 1625 are implemented in a single device, such as a processor with a memory.

The game server 1605 includes a game database 1635 for storing game information, player's profiles, information about a total amount of aggregated in-game currency, information about a current location of a pointer associated with each player, information about a current difficulty level associated with each player, information about bets, game rules, design data, information about long-term challenges, music, videos, graphical information, audio information, and so forth.

The game server 1605 can also be associated with a website, which the player can access to play the slots adventure game. The game server 1605 can also be associated with a web service, which enables the players to access using mobile or software applications using, for example, a predetermined application program interface (API). Thus, the game server 1605 allows implementing an online casino, where players can enjoy the slots adventure game remotely using their client devices 1610.

Figure 17:
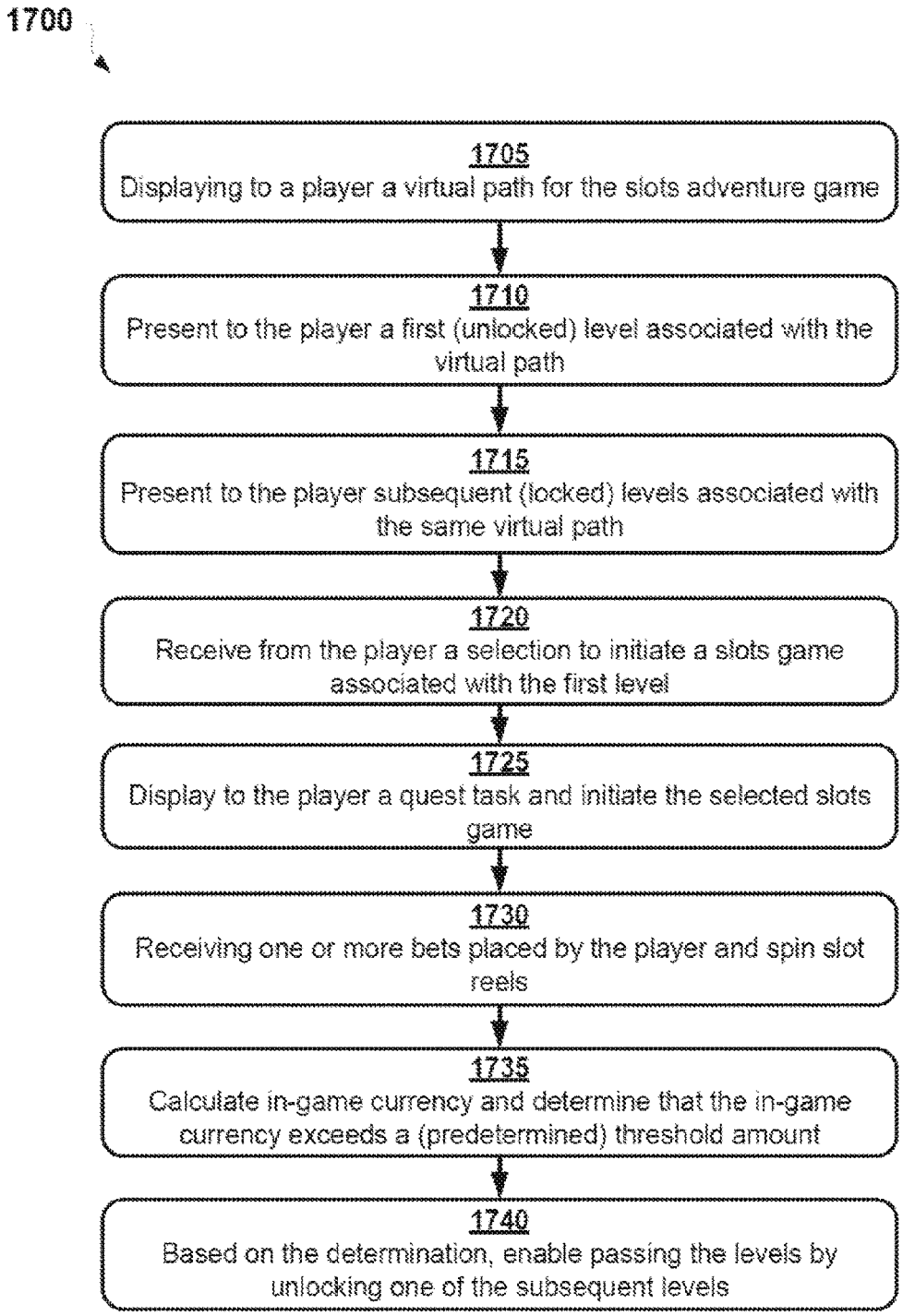
FIG. 17 is a process flow diagram showing a method for executing a slots adventure game according to an example embodiment.

FIG. 17 is a process flow diagram showing a method 1700 for executing a slots adventure game according to an example embodiment. The method 1700 may be performed by processing logic that may comprise hardware (e.g., decision-making logic, dedicated logic, programmable logic, ASIC logic, and microcode), software (such as software run on a general-purpose computer system or a dedicated machine), or a combination of both. In one example embodiment, the processing logic refers to one or more modules of spin machine 1500 and/or game server 1605. Notably, below recited steps of the method 1700 may be implemented in an order different than described and shown in the figure. Moreover, the method 1700 may have additional steps not shown herein, but which can be evident for those skilled in the art from the present disclosure. The method 1700 may also have fewer steps than outlined below and shown in FIG. 17.

The method 1700 commences at step 1705 with a game controller causing to display to a player a virtual path for the slots adventure game having multiple levels, where each of the levels is associated with one of a plurality of level types. Moreover, a pointer can be also displayed on the virtual path. The pointer is associated with an advancement of the player in the slots adventure game. The virtual path can be also associated with a virtual map.

At step 1710, the game controller causes to present to the player a first (unlocked) level associated with the virtual path, where a first slots game of the first level is readily available for the player to play. At step 1715, the game controller causes to present to the player subsequent (locked) levels associated with the same virtual path, where the subsequent levels are locked and not initially available for the player to play. At step 1720, the game controller receives from the player a selection (e.g., an input made using one of input devices) to initiate a slots game associated with the first level. At step 1725, the game controller causes to display to the player a quest task associated with the current slots game and initiate a selected slots game based on the selection of the player received at the previous step. At step 1730, the game controller receives one or more bets (e.g., bets in in-game currency) placed by the player on the selected slots game. The game controller further causes to spin slot reels of the selected slots game based on the one or more bets. At step 1735, the game controller calculates, for each spinning event of slot reels, in-game currency based on at least one of the following: a number of spinning events, the one or more bets, and one or more predetermined game rules. At step 1740, the game controller determines that the in-game currency exceeds a predetermined threshold amount of in-game currency associated with the selected slots game. Based on the determination, the game controller causes to enable passing the levels by unlocking each of the subsequent levels sequentially.

Figure 18:
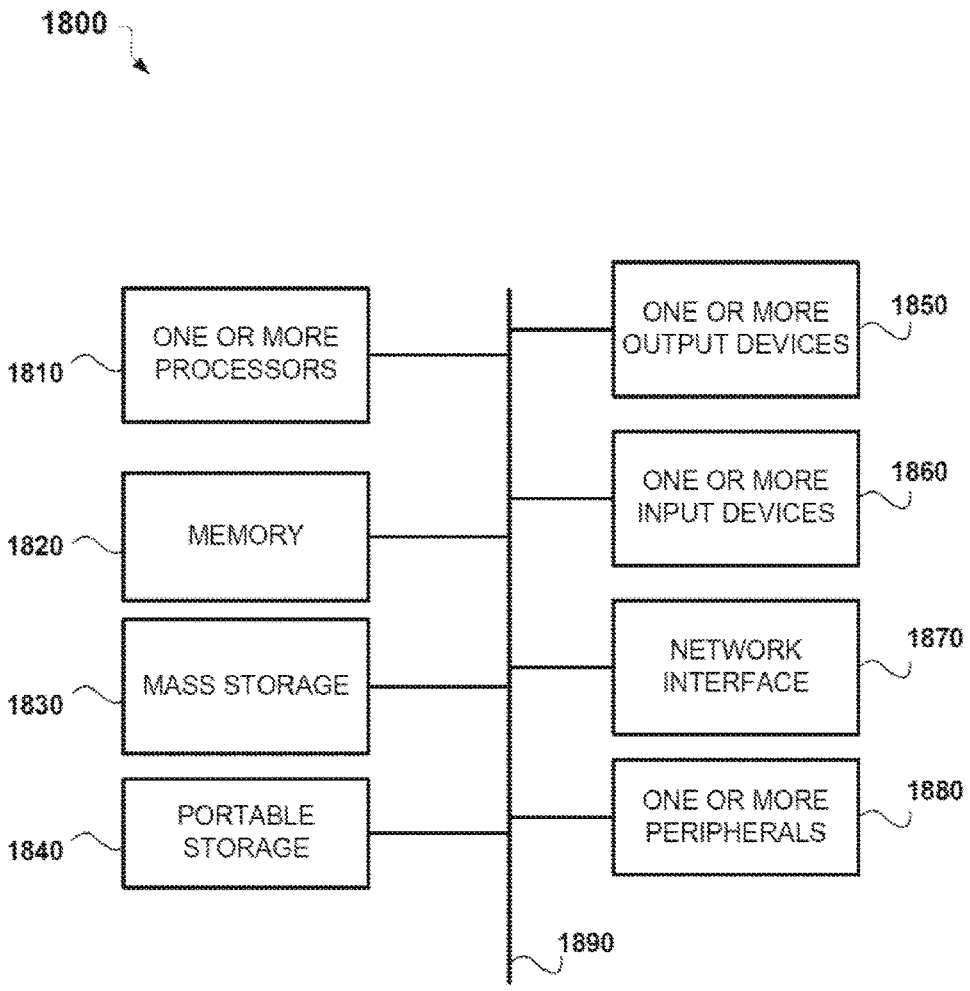
FIG. 18 is a computer system that may be used to implement the methods for executing a slots adventure game according to an example embodiment.

FIG. 18 illustrates an exemplary computing system 1800 that may be used to implement embodiments described herein. System 1800 of may be implemented in the contexts of the likes of spin machine 1500, game server 1605, and/or client devices 1610. The computing system 1800 of FIG. 18 may include one or more processors 1810 and a memory 1820. Memory 1820 stores, in part, instructions and data for execution by processor 1810. Memory 1820 can store the executable code when the system 1800 is in operation. The system 1800 of FIG. 18 may further include a mass storage device 1830, a portable storage medium drive(s) 1840, one or more output devices 1850, one or more input devices 1860, a network interface 1870, and one or more peripheral devices 1880.

The components shown in FIG. 18 are depicted as being connected via a single bus 1890. The components may be connected through one or more data transport means. The processor 1810 and memory 1820 may be connected via a local microprocessor bus, and the mass storage device 1830, peripheral device(s) 1880, portable storage device 1840, and network interface 1870 may be connected via one or more input/output (I/O) buses.

The mass storage device 1830, which may be implemented with a magnetic disk drive or an optical disk drive, is a non-volatile storage device for storing data and instructions for use by a magnetic disk or an optical disk drive, which in turn may be used by the processor 1810. The mass storage device 1830 can store the system software for implementing embodiments described herein for purposes of loading that software into the memory 1820.

The portable storage medium drive(s) 1840 operates in conjunction with a portable non-volatile storage medium, such as a flash drive, to input and output data and code to and from the computer system 1800 of FIG. 18. The system software for implementing embodiments described herein may be stored on such a portable medium and input to the computer system 1800 via the portable storage medium drive(s) 1840.

The input devices 1860 provide a portion of a user interface. Input devices 1860 may include an alphanumeric keypad, such as a keyboard, for inputting alphanumeric and other information, or a pointing device, such as a mouse, a trackball, a stylus, or cursor direction keys. Additionally, the system 1800 as shown in FIG. 18 includes output devices 1850. Suitable output devices include speakers, printers, and displays.

The network interface 1870 can be utilized to communicate with external devices, external computing devices, servers, and networked systems via one or more communications networks such as one or more wired, wireless, or optical networks including, for example, the Internet.

The peripherals 1880 may include any type of computer support device to add additional functionality to the computer system. The peripheral device(s) 1880 may include a modem or a router. The components contained in the computer system 1800 of FIG. 18 are those typically found in computer systems that may be suitable for use with embodiments described herein and are intended to represent a broad category of such computer components that are well known in the art. Thus, the computer system 1800 of FIG. 13 can be a personal computer, hand held computing device, telephone, mobile computing device, workstation, server, minicomputer, mainframe computer, or any other computing device. The computer system 1800 can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., processor-readable or computer-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system random access memory (RAM). Transmission media include coaxial cables, copper wire, and fiber optics, among others, including the wires that include one embodiment of a bus. Transmission media can also take the form of acoustic or light waves, such as those generated during radio frequency (RF) and infrared (IR) data communications. Common forms of computer-readable media include, for example, a flash drive, hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read. Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, the methods and systems for executing the slots adventure game have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for executing a slots adventure game, the method comprising:

displaying to a player, by a display, a virtual path for the slots adventure game having multiple levels, wherein each of the levels is associated with one of a plurality of level types;

presenting to the player, by the display, a first level associated with the virtual path, *the first level being associated with a first slots game,* wherein [a] *the* first slots game of the first level is readily available for the player to play;

presenting to the player, by the display, subsequent levels associated with the same virtual path, wherein the subsequent levels are locked and not initially available for the player to play, wherein the first level and the subsequent levels are displayed simultaneously;

presenting to the player by the display [a plurality of quest tasks] *widgets* for each of the levels, wherein [each of the quest tasks includes a text widget] *the widgets are associated with a plurality of quest tasks, the widgets* describing requirements for completing the quest [task] *tasks*, wherein the at least one level is completed by the player when any of the quest tasks is completed;

receiving from the player, via an input device, a selection of one of the quest tasks in each of the levels, wherein the selected quest task is associated with a predetermined threshold value;

initiating, by a game controller, a slots game corresponding to the selected quest task;

receiving, via a money acceptor, one or more bets placed on the selected slots game;

spinning, by a spin controller, mechanical slot reels based on the one or more bets, wherein the spin controller differs from the game controller, and wherein the spin controller, the game controller, the money acceptor, and the mechanical slot reels are associated with a spin machine;

calculating, by the game controller, game points based on a number of spinning events and the one or more bets;

determining, by the game controller, that the game points exceed the predetermined threshold value; and based on the determination, enabling the player, by the game controller, to complete the selected quest task and pass the levels by unlocking each of the subsequent levels sequentially.

2. The method of claim 1, further comprising a step of displaying a pointer on the virtual path, wherein the pointer is associated with an advancement of the player in the slots adventure game.

3. The method of claim 2, further comprising:

displaying, by the display, one or more first icons associated with a current level; and displaying, by the display, one or more second icons associated with the current level;

wherein the one or more first icons are graphically different from the one or more second icons;

wherein, when enabled or clicked by the player, each of the first icons is configured to activate one slots game associated with one quest task of the current level; and wherein, when enabled or clicked by the player, each of the second icons is configured to activate another slots game associated with another quest task of the current level.

4. The method of claim 2, further comprising;

displaying, by the display, a first widget associated with the first level; and displaying, by the display, a second widget associated with the subsequent level, wherein the first widget is graphically different from the second widget; and placing the pointer near the first widget.

5. The method of claim 4, further comprising a step of moving the pointer along the virtual path from the first widget, which represents the first level, to the second widget, which represents the subsequent level.

6. The method of claim 5, wherein the pointer is moved to the second widget representing the subsequent level, which was last unlocked.

7. The method of claim 1, wherein the virtual path is displayed on a virtual map.

8. The method of claim 1, further comprising a step of providing a bonus slots game for the player to enable the player to acquire additional in-game currency.

9. The method of claim 1, further comprising a step of providing a lottery game enabling the player to acquire additional in-game currency.

10. The method of claim 1, further comprising a step of providing a feedback to the player to involve him in the slots adventure game and granting the player additional in-game currency in return for the feedback.

11. The method of claim 1, further comprising a step of providing a review to the player to involve him in the slots adventure game and granting the player additional in-game currency in return for the review.

12. The method of claim 1, further comprising a step of providing a long-term challenge for the player to complete at least five of tasks to collect a predetermined reward, wherein the long-term challenge is valid for a predetermined period in a range between 1 hour and 24 hours.

13. The method of claim 1, further comprising a step of displaying a progress bar for showing a progress of a quest task in the selected slots game.

14. A non-transitory processor-readable medium having instructions stored thereon, which when executed by one or more processors, cause the one or more processors to implement a method, comprising:

displaying to a player, by a display, a virtual path for the slots adventure game having multiple levels, wherein each of the levels is associated with one of a plurality of level types;

presenting to the player, by the display, a first level associated with the virtual path, *the first level being associated with a first slots game,* wherein [a] *the* first slots game of the first level is readily available for the player to play;

presenting to the player, by the display, subsequent levels associated with the same virtual path, wherein the subsequent levels are locked and not initially available for the player to play, wherein the first level and the subsequent levels are displayed simultaneously;

presenting to the player by the display [a plurality of quest tasks] *widgets* for each of the levels, wherein [each of the quest tasks includes a text widget] *the widgets are associated with a plurality of quest tasks, the widgets* describing requirements for completing the quest [task] *tasks*, wherein the at least one level is completed by the player when any of the quest tasks is completed;

receiving from the player, via an input device, a selection of one of the quest tasks in each of the levels, wherein the selected quest task is associated with a predetermined threshold value;

initiating, by a game controller, a slots game corresponding to the selected quest task;

receiving, via the input device or a money acceptor, one or more bets placed on the selected slots game;

spinning, by a spin controller, mechanical slot reels based on the one or more bets, wherein the spin controller differs from the game controller, and wherein the spin controller, the game controller, the money acceptor, and the mechanical slot reels are associated with a spin machine;

calculating, by the game controller, game points based on a number of spinning events and the one or more bets;

determining, by the game controller, that the game points exceed the predetermined threshold value; and based on the determination, enabling the player, by the game controller, to complete the selected quest task and pass the levels by unlocking each of the subsequent levels sequentially.

*15. A computer-implemented method for executing a slots adventure game on a mobile computing device, the method comprising:*

*displaying, by a display associated with the mobile computing device, to a player, a virtual path for the slots adventure game having multiple levels, wherein each of the levels is associated with one of a plurality of level types;*

*presenting, by the display, to the player, a first level associated with the virtual path, the first level being associated with a first slots game, wherein the first slots game of the first level is readily available for the player to play;*

*presenting, by the display, to the player, subsequent levels associated with the same virtual path, wherein the subsequent levels are locked and not initially available for the player to play, wherein the first level and the subsequent levels are displayed simultaneously;*

*presenting, by the display, to the player, widgets for each of the levels, wherein the widgets are associated with a plurality of quest tasks, the widgets describing requirements for completing the quest tasks, wherein the at least one level is completed by the player when any of the quest tasks is completed;*

*receiving, via an input device associated with the mobile computing device, from the player, a selection of one of the quest tasks in each of the levels, wherein the selected quest task is associated with a predetermined threshold value;*

*initiating, by a game controller associated with the mobile computing device in communication with a web service, a slots game corresponding to the selected quest task;*

*receiving, via a money acceptor, one or more bets placed on the selected slots game;*

*spinning, by a spin controller, via a graphical user interface associated with the mobile computing device, slot reels based on the one or more bets, wherein the spin controller differs from the game controller, and wherein the spin controller, the game controller, the money acceptor, and the slot reels are associated with the mobile computing device;*

*calculating, by the game controller, game points based on a number of spinning events and the one or more bets;*

*determining, by the game controller, that the game points exceed the predetermined threshold value; and*

*based on the determination, enabling, by the game controller, the player to complete the selected quest task and pass the levels by unlocking each of the subsequent levels sequentially.*

*16. The method of claim 15, further comprising a step of displaying a pointer on the virtual path, wherein the pointer is associated with an advancement of the player in the slots adventure game.*

*17. The method of claim 16, wherein the presenting the widgets for each of the levels includes:*

*displaying, by the display, a first widget associated with a current level; and*

*displaying, by the display, a subsequent widget associated with a subsequent level; and*

*wherein the first widget is graphically different from the subsequent widget.*

*18. The method of claim 17, further comprising a step of placing the pointer near the first widget.*

*19. The method of claim 18, further comprising a step of moving the pointer along the virtual path from the first widget representing the current level to the subsequent widget representing the subsequent level.*

*20. The method of claim 19, wherein the subsequent level is the last unlocked.*

*21. The method of claim 15, wherein the virtual path is associated with a virtual map.*

*22. The method of claim 15, further comprising a step of providing a bonus slots game for the player to enable the player to acquire additional in-game currency.*

*23. The method of claim 15, further comprising a step of providing a lottery game enabling the player to acquire additional in-game currency.*

*24. The method of claim 15, further comprising a step of providing a feedback to the player to involve the player in the slots adventure game.*

*25. The method of claim 15, further comprising a step of providing a review to the player to involve the player in the slots adventure game.*

*26. The method of claim 15, further comprising a step of providing a long-term challenge for the player to complete at least five tasks to collect a predetermined reward, wherein the long-term challenge is valid for a predetermined period in a range between 1 hour and 24 hours.*

*27. The method of claim 15, further comprising a step of displaying a progress bar for showing a progress of a quest task in the selected slots game.*

*28. A non-transitory processor-readable medium having instructions stored thereon, which when executed by one or more processors, cause the one or more processors to implement a method, comprising:*

*displaying, by a display associated with a mobile computing device, to a player, a virtual path for the slots adventure game having multiple levels, wherein each of the levels is associated with one of a plurality of level types;*

*presenting, by the display, to the player, a first level associated with the virtual path, the first level being associated with a first slots game, wherein the first slots game of the first level is readily available for the player to play;*

*presenting, by the display, to the player, subsequent levels associated with the same virtual path, wherein the subsequent levels are locked and not initially available for the player to play, wherein the first level and the subsequent levels are displayed simultaneously;*

*presenting, by the display, to the player, widgets for each of the levels, wherein the widgets are associated with a plurality of quest tasks, the widgets describing requirements for completing the quest tasks, wherein the at least one level is completed by the player when any of the quest tasks is completed;*

*receiving, via an input device associated with the mobile computing device, from the player, a selection of one of the quest tasks in each of the levels, wherein the selected quest task is associated with a predetermined threshold value;*

*initiating, by a game controller associated with the mobile computing device and in communication with a web service, a slots game corresponding to the selected quest task;*

*receiving, via a money acceptor, one or more bets placed on the selected slots game;*

*spinning, by a spin controller, via a graphical user interface associated with the mobile computing device, slot reels based on the one or more bets, wherein the spin controller differs from the game controller, and wherein the spin controller, the game controller, the money acceptor, and the slot reels are associated with the mobile computing device;*

*calculating, by the game controller, game points based on a number of spinning events and the one or more bets;*

*determining, by the game controller, that the game points exceed the predetermined threshold value; and*

*based on the determination, enabling, by the game controller, the player to complete the selected quest task and pass the levels by unlocking each of the subsequent levels sequentially.*

* * * * *